US010411545B2

(12) United States Patent
Haga et al.

(10) Patent No.: US 10,411,545 B2
(45) Date of Patent: Sep. 10, 2019

(54) MOTOR INCLUDING BUSBAR PORTION

(71) Applicant: Nidec Corporation, Kyoto (JP)

(72) Inventors: Hidehiro Haga, Kyoto (JP); Ryusuke Sato, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 618 days.

(21) Appl. No.: 14/674,102

(22) Filed: Mar. 31, 2015

(65) Prior Publication Data

US 2016/0013697 A1    Jan. 14, 2016

(30) Foreign Application Priority Data

Jul. 14, 2014    (JP) .................. 2014-144334

(51) Int. Cl.

| H02K 5/10 | (2006.01) |
|---|---|
| H02K 3/28 | (2006.01) |
| H02K 1/06 | (2006.01) |
| H02K 5/04 | (2006.01) |
| H02K 5/16 | (2006.01) |
| H02K 3/52 | (2006.01) |
| H02K 5/08 | (2006.01) |
| H02K 5/173 | (2006.01) |

(52) U.S. Cl.
CPC ............... *H02K 5/10* (2013.01); *H02K 1/06* (2013.01); *H02K 3/28* (2013.01); *H02K 3/522* (2013.01); *H02K 5/04* (2013.01); *H02K 5/08* (2013.01); *H02K 5/161* (2013.01); *H02K 5/1732* (2013.01); *H02K 2203/09* (2013.01)

(58) Field of Classification Search
CPC .. H02K 5/10; H02K 5/04; H02K 5/08; H02K 5/161; H02K 5/1732; H02K 1/06; H02K 3/28; H02K 3/522; H02K 2203/09

USPC .................................... 310/71, 89, 90, 91
See application file for complete search history.

(56) References Cited

U.S. PATENT DOCUMENTS

| 6,879,071 B2 | 4/2005 | Kanazawa et al. |
| 7,498,702 B2 | 3/2009 | Migita et al. |
| 7,663,287 B2 | 2/2010 | Haga et al. |
| 8,729,754 B2 | 5/2014 | Fujii et al. |

(Continued)

FOREIGN PATENT DOCUMENTS

| CN | 103368314 A | 10/2013 |
| JP | 2004-248492 A | 9/2004 |

(Continued)

OTHER PUBLICATIONS

Machine translation of JP2010136596A (Jun. 2010).*
Furukawa et al.; "Inner-Rotor Motor"; U.S. Appl. No. 14/267,304, filed May 1, 2014.

*Primary Examiner* — Michael Andrews
(74) *Attorney, Agent, or Firm* — Keating & Bennett, LLP

(57) ABSTRACT

A motor includes a rotor, a stator, first and second bearings supporting the rotor, a bus bar portion, and a tubular housing retaining the bus bar portion, the stator, and the first bearing. The housing includes a circular bottom portion including a through-hole, and a first bearing retaining portion retaining the first bearing and extending in one direction. The bus bar portion includes a bus bar, and a bus bar holder supporting the bus bar. The bus bar holder includes a second bearing retaining portion retaining the second bearing, and a tubular main body portion. The main body portion is positioned by the stator.

33 Claims, 15 Drawing Sheets

(56) References Cited

U.S. PATENT DOCUMENTS

| | | | |
|---|---|---|---|
| 2006/0068617 A1 | 3/2006 | Migita et al. | |
| 2007/0278876 A1* | 12/2007 | Haga et al. | H02K 11/00 310/71 |
| 2011/0006625 A1* | 1/2011 | Fujii et al. | H02K 5/22 310/71 |
| 2013/0038152 A1* | 2/2013 | Woo | H02K 3/522 310/71 |

FOREIGN PATENT DOCUMENTS

| | | | | |
|---|---|---|---|---|
| JP | 2008-187875 A | 8/2008 | | |
| JP | 2010-136596 A | 6/2010 | | |
| JP | 2010136596 A | * | 6/2010 | H02K 5/10 |

* cited by examiner

MOTOR INCLUDING BUSBAR PORTION

BACKGROUND OF THE INVENTION

1. Field of the Invention

The present invention relates to a motor.

2. Description of the Related Art

As shown in, for example, Japanese Unexamined Patent Application Publication No. 2010-136596, a motor in which a bearing on one side, which supports a rotary shaft of a rotor, is held by a holder in which a bus bar is disposed, and a bearing on the other side is held by a bracket which accommodates the holder is known.

In the motor as described above, a first opening portion and a second opening portion having a larger inner diameter than that of the first opening portion are provided in an opening portion of the bracket and an inclined surface portion is provided between the first opening portion and the second opening portion. That is, a step is provided on the inside of the bracket. The holder is positioned by being fitted to the step provided on the inside of the bracket.

However, in the configuration as described above, since the step is provided on the inside of the bracket, the bracket is increased in size in a radial direction, and as a result, there is a problem in that the motor is increased in size in the radial direction.

SUMMARY OF THE INVENTION

A motor according to a preferred embodiment of the present invention preferably includes a rotor including a shaft centered on a central axis extending in one direction; a stator surrounding the rotor and rotating the rotor around the shaft; a first bearing which is disposed on a first side in the one direction of the stator and supports the shaft; a second bearing which is disposed on a second side opposite to the first side of the stator and supports the shaft; a bus bar portion supplying a drive current to the stator; and a tubular housing retaining the bus bar portion, the stator, and the first bearing. The housing includes a circular bottom portion including a through-hole, and a first bearing retaining portion retaining the first bearing and extending in the one direction. The housing includes an output shaft hole which is open to the first side. The first bearing retaining portion includes at least a portion of the output shaft hole, and an end portion on the first side of the shaft protrudes from the output shaft hole to the outside of the housing through the through-hole. The bus bar portion includes a bus bar which is electrically connected to the stator, and a bus bar holder which supports the bus bar. The bus bar holder includes a second bearing retaining portion retaining the second bearing, and a tubular main body portion. The main body portion is positioned by the stator in the one direction and a radial direction of the shaft.

According to the above preferred embodiment of the present invention, a motor is provided which has a structure in which it is possible to position a bus bar holder while preventing an increase in size.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, motors according to preferred embodiments of the present invention will be described with reference to the drawings. In addition, the scope of the present invention is not limited to the following preferred embodiments and can be arbitrarily changed in any desirable manner within the scope of the technical idea of the present invention. Further, in the following drawings, in order to make each configuration clearly understandable, there is a case of making the number, or the like, of each structure different from that in the actual structure of some possible embodiments of the present invention.

Figure 1:
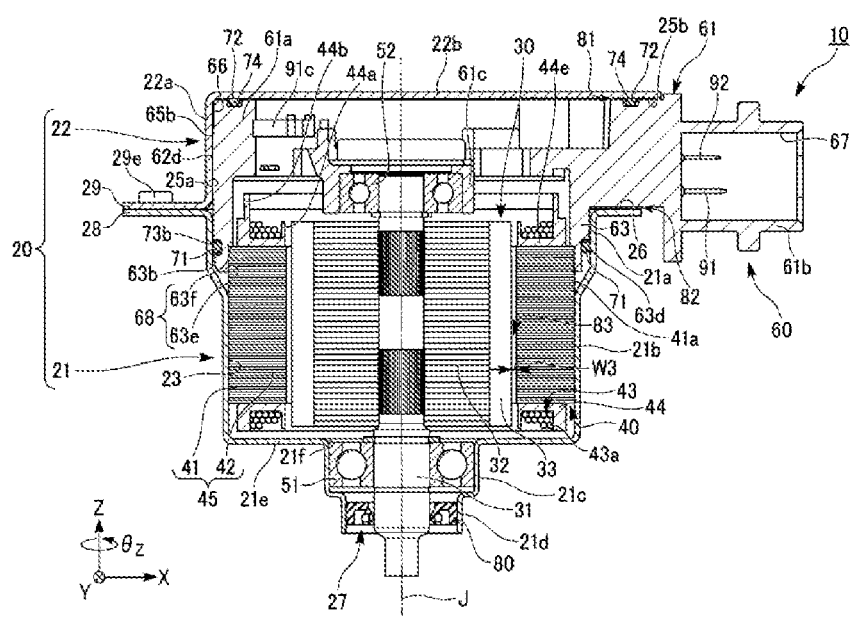
FIG. 1 is a cross-sectional view showing a motor according to a first preferred embodiment of the present invention.

Further, in the drawings, an XYZ coordinate system is appropriately shown as a three-dimensional orthogonal coordinate system, and a Z-axis direction is set to be an axial direction (one direction) of a shaft 31 shown in FIG. 1, an X-axis direction is set to be a length direction of a bus bar portion 60 shown in FIG. 1, that is, a right-left direction in FIG. 1, and a Y-axis direction is set to be a width direction of the bus bar portion 60, that is, a direction orthogonal to both the X-axis direction and the Z-axis direction. Further, in the following description, the positive side (the +Z side) of the Z-axis direction is set to be a rear side (a second side) and the negative side (the −Z side) of the Z-axis direction is set to be a front side (a first side). Further, a direction around the axis of the shaft 31 is set to be a $\theta_z$ direction. Further, unless otherwise specified, in the following description, an axial direction shall mean the axial direction of the shaft 31.

FIG. 1 is a cross-sectional view showing a motor 10 according to a preferred embodiment of the present invention. The cross-section shown in FIG. 1 is a cross-section passing through a teeth portion 42 of a stator 40 (described later). The motor 10 according to this preferred embodiment is a brushless motor. The motor 10 is preferably provided with a housing 20, a rotor 30 including the shaft 31, the stator 40, the bus bar portion 60, a plurality of O-rings, a front bearing (a first bearing) 51, a rear bearing (a second bearing) 52, and an oil seal 80, as shown in FIG. 1. The plurality of O-rings preferably include a front side O-ring (a first O-ring) 71 and a rear side O-ring (a second O-ring) 72.

The housing 20 is preferably a tubular metal member in which the bus bar portion 60 is, for example, press-fitted on the inside thereof. The housing 20 preferably includes a front housing portion (a first housing portion) 21 and a rear housing portion (a second housing portion) 22. The rotor 30, the stator 40, the bus bar portion 60, the front bearing 51, the rear bearing 52, the front side O-ring 71, the rear side O-ring 72, and the oil seal 80 are retained inside the housing 20.

Figure 2:
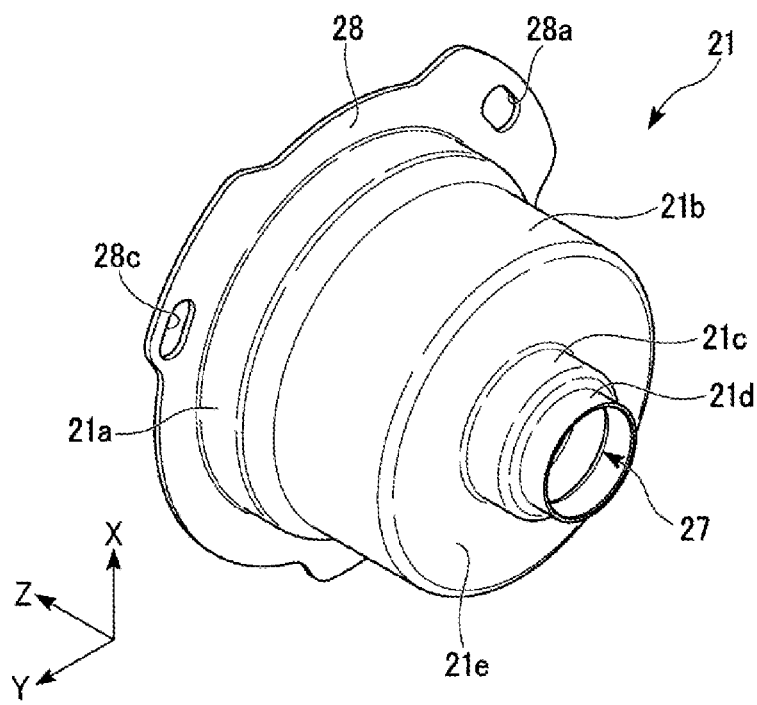
FIG. 2 is a perspective view showing a front housing portion in the first preferred embodiment of the present invention.
Figure 3:
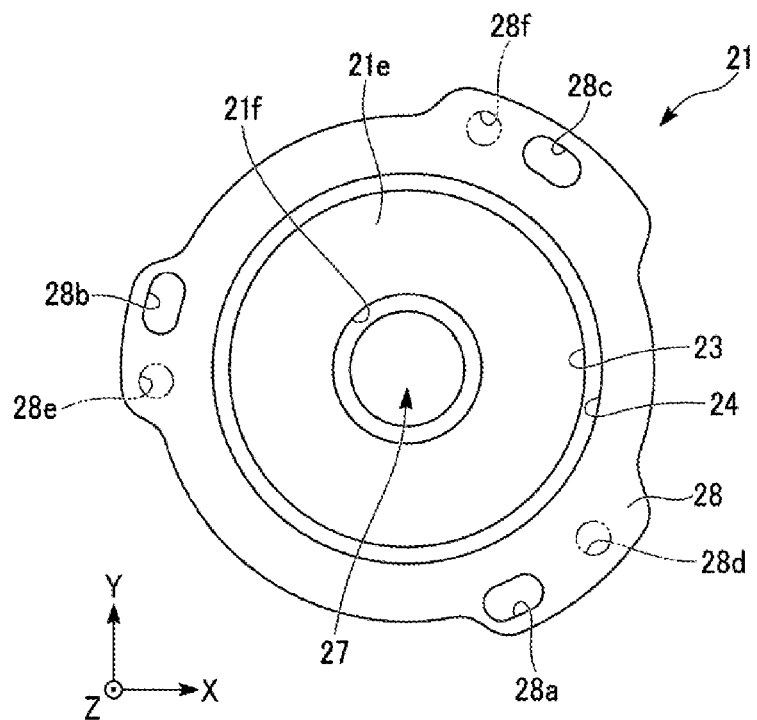
FIG. 3 is a plan view showing the front housing portion in the first preferred embodiment of the present invention.
Figure 4:
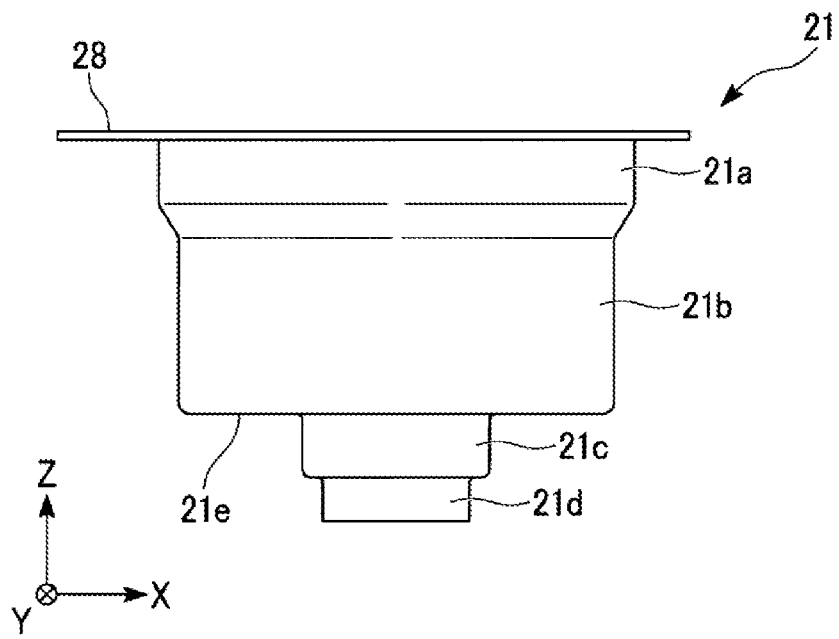
FIG. 4 is a front view showing the front housing portion in the first preferred embodiment of the present invention.

FIGS. 2 to 4 are drawings showing the front housing portion 21. FIG. 2 is a perspective view. FIG. 3 is a plan view, that is, a diagram as viewed from the rear side (the +Z side). FIG. 4 is a front view. The front housing portion 21 preferably has a multistage cylindrical shape including a front side opening portion 24 and an output shaft hole 27 at both ends, as shown in FIGS. 1 to 3. That is, the housing 20 includes the output shaft hole 27.

The front housing portion 21 preferably includes a front side flange portion 28, a bus bar holder insertion portion (a first tubular portion) 21a, a stator retaining portion 21b, a front bearing retaining portion (a first bearing retaining portion) 21c, and an oil seal retaining portion 21d in this order along the axial direction (the Z-axis direction) from the front side opening portion 24 side (the +Z side). In other words, the housing 20 includes the front side flange portion 28, the bus bar holder insertion portion 21a, the stator retaining portion 21b, the front bearing retaining portion 21c, and the oil seal retaining portion 21d. The bus bar holder insertion portion 21a, the stator retaining portion 21b, the front bearing retaining portion 21c, and the oil seal retaining portion 21d respectively have concentric cylindrical shapes and the diameters thereof are made smaller in this order.

The front side flange portion 28 extends radially outward from an end portion on the rear side (the +Z side) of the bus bar holder insertion portion 21a. The front side flange portion 28 has through-holes 28a, 28b, and 28c penetrating in a thickness direction (the Z-axis direction), as shown in FIGS. 2 and 3. The shape in a plan view (an X-Y plane view) of each of the through-holes 28a, 28b, and 28c is not particularly limited and is, in this preferred embodiment, for example, a rectangular of substantially rectangular shape with rounded corners, as shown in FIG. 3.

The bus bar holder insertion portion 21a surrounds an end portion on the front side (the −Z side) of the bus bar portion 60 from the outside in a radial direction of the shaft 31, as shown in FIG. 1. The bus bar holder insertion portion 21a includes the front side opening portion 24.

The stator retaining portion 21b includes a bottom portion 21e being circular or substantially circular in a plan view (an X-Y plane view) and including a through-hole 21f, as shown in FIGS. 1 and 3. In other words, the housing 20 preferably includes the bottom portion 21e. The through-hole 21f communicates with the output shaft hole 27. The outer circumferential surface of the stator 40, that is, a core back outer side surface 41a of a core back portion 41 (described later), is fitted to an inner circumferential surface 23 of the stator retaining portion 21b. In this way, the stator 40 is retained in the front housing portion 21.

The front bearing retaining portion 21c retains the front bearing 51. In this preferred embodiment, the inner circumferential surface of the front bearing retaining portion 21c is fitted to the outer circumferential surface of the front bearing 51. The front bearing retaining portion 21c extends in the axial direction (the Z-axis direction).

The oil seal retaining portion 21d retains the oil seal 80 on the inside thereof. The oil seal retaining portion 21d extends farther to the front side (the +Z side) in the axial direction (the Z-axis direction) than the front bearing retaining portion 21c.

The output shaft hole 27 is preferably defined by the inside of the front bearing retaining portion 21c and the inside of the oil seal retaining portion 21d. In other words, each of the front bearing retaining portion 21c and the oil seal retaining portion 21d has at least a portion of the output shaft hole 27.

The rear housing portion 22 is provided on the bus bar portion 60 side (the +Z side), that is, the rear side of the front housing portion 21, as shown in FIG. 1.

Figure 5:
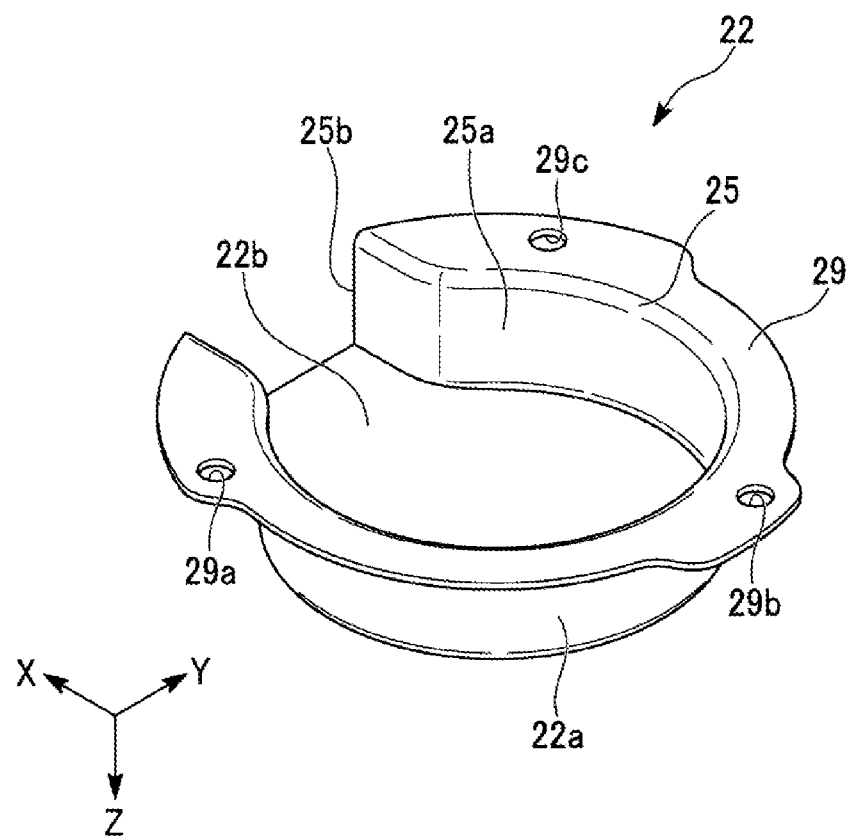
FIG. 5 is a perspective view showing a rear housing portion in the first preferred embodiment of the present invention.
Figure 6:
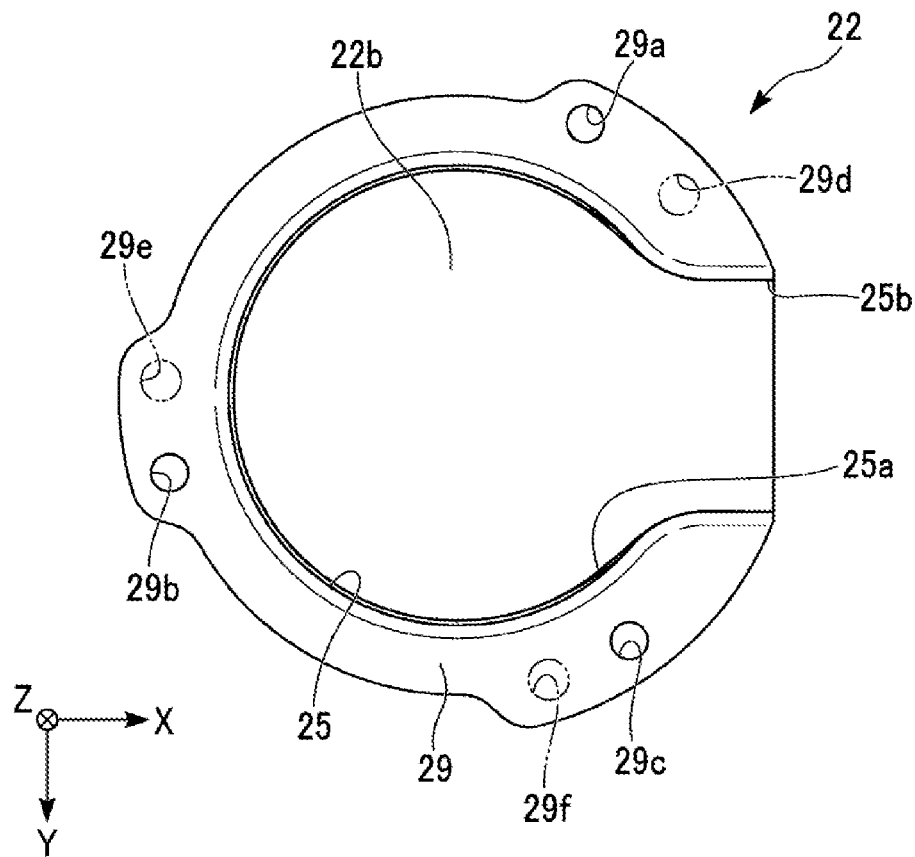
FIG. 6 is a bottom view showing the rear housing portion in the first preferred embodiment of the present invention.
Figure 7:
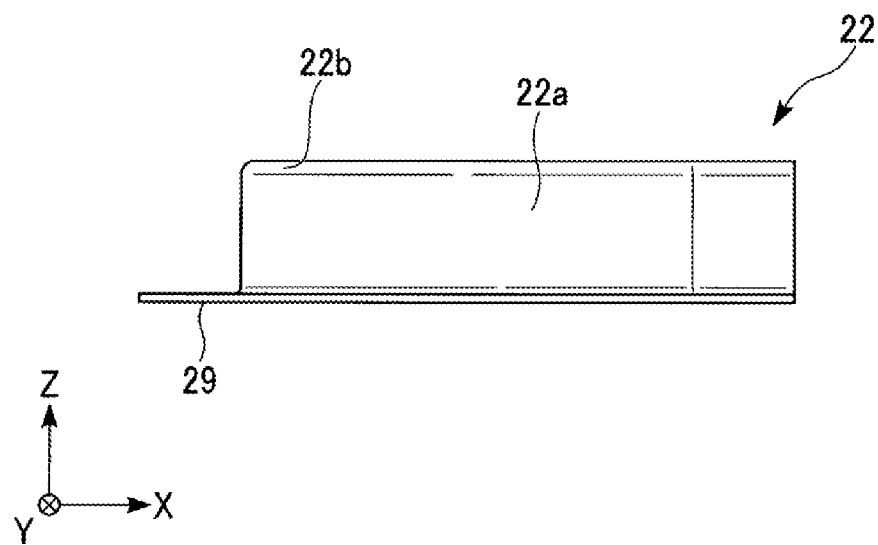
FIG. 7 is a front view showing the rear housing portion in the first preferred embodiment of the present invention.

FIGS. 5 to 7 are diagrams showing the rear housing portion 22. FIG. 5 is a perspective view. FIG. 6 is a bottom view, that is, a diagram as viewed from the front side (the −Z side). FIG. 7 is a front view.

The rear housing portion 22 preferably includes a bus bar holder press-fitting portion (a second tubular portion) 22a, a lid portion 22b, and a rear side flange portion 29, as shown in FIGS. 5 to 7.

The bus bar holder press-fitting portion 22a preferably has a tubular shape including a rear side opening portion 25 which is open to the front side (the −Z side), as shown in FIGS. 1 and 5 to 7. The bus bar holder press-fitting portion 22a surrounds the bus bar portion 60, more specifically, an end portion on the rear side (the +Z side) of a main body portion 61a of the bus bar portion 60 (described later) from the outside in the radial direction of the shaft 31. The bus bar holder press-fitting portion 22a is connected to the end portion on the rear side (the +Z side) of the bus bar holder insertion portion 21a in the front housing portion 21 through the front side flange portion 28 and the rear side flange portion 29.

The shape in a plan view (an X-Y plane view) of the bus bar holder press-fitting portion 22a is a shape in which a rectangular or substantially rectangular shape is connected to a circular or substantially circular shape. The inner circumferential surface of the bus bar holder press-fitting portion 22a includes an inner circumferential surface 25a having a cylindrical or substantially cylindrical surface shape. A cutout portion 25b in which a portion of a rectangular or substantially rectangular shaped portion of the bus bar holder press-fitting portion 22a is cut out in the axial direction (the Z-axis direction) is present in the rectangular or substantially rectangular shaped portion of the bus bar holder press-fitting portion 22a. That is, the rear housing portion 22 includes the cutout portion 25b in which a portion of the bus bar holder press-fitting portion 22a is cut out in the axial direction (the Z-axis direction).

The lid portion 22b is connected to an end portion on the rear side (the +Z side) of the bus bar holder press-fitting portion 22a. The lid portion 22b covers the end portion on the rear side (the +Z side) of the main body portion 61a. The lid portion 22b closes the rear side (the +Z side) in the axial direction (the Z-axis direction) of an outer shell portion 62 (described later). The surface on the front side (the −Z side) of the lid portion 22b is in contact with the whole circumference of the rear side O-ring 72.

The rear side flange portion 29 extends radially outward from an end portion on the front side (the −Z side) of the bus bar holder press-fitting portion 22a. Through-holes 29a, 29b, and 29c penetrating in the thickness direction (the Z-axis direction) are present in the rear side flange portion 29, as shown in FIGS. 5 and 6. The shape in a plan view (an X-Y plane view) of each of the through-holes 29a to 29c is not particularly limited and is, in this preferred embodiment, for example, a circular or substantially circular shape.

As shown in FIG. 1, the front housing portion 21 and the rear housing portion 22 are joined to each other with the front side flange portion 28 and the rear side flange portion 29 superimposed on each other.

In this preferred embodiment, an opening portion of a connector 26 is configured with the front side flange portion 28 which is the end portion on the rear side (the +Z side) of the bus bar holder insertion portion 21a in the front housing portion 21, and the cutout portion 25b of the rear housing portion 22. In other words, the opening portion of a connector 26 is configured with the front housing portion 21 and the rear housing portion 22. The opening portion of a connector 26 is open in a direction (the X-axis direction) orthogonal to the axial direction (the Z-axis direction).

The rotor 30 preferably includes the shaft 31, a rotor core 32, and a rotor magnet 33, as shown in FIG. 1.

The shaft 31 is centered on a central axis J extending in one direction (the Z-axis direction). The shaft 31 is supported by the front bearing 51 and the rear bearing 52 so as to be able to rotate around the axis (in the $\theta_z$ direction). An end portion on the front side (the −Z side) of the shaft 31 protrudes from the output shaft hole 27 to the outside of the housing 20 through the through-hole 21f which is located at the bottom portion 21e in the stator retaining portion 21b. The oil seal 80 is provided around the axis of the shaft 31.

The rotor core 32 surrounds the shaft 31 in the direction around the axis (the $\theta_z$ direction) and is fixed to the shaft 31.

The rotor magnet 33 is fixed to the outer circumferential surface along the direction around the axis (the $\theta_z$ direction) of the rotor core 32.

The rotor core 32 and the rotor magnet 33 rotate integrally with the shaft 31.

The stator 40 surrounds the rotor 30 in the direction around the axis (the $\theta_z$ direction) and rotates the rotor 30 around the shaft 31. The stator 40 preferably includes a stator core 45 which includes the core back portion 41 and the teeth portion 42, a coil portion 43 disposed at the teeth portion 42, and a bobbin (an electrical insulator) 44 on which the coil portion 43 is provided.

The shape of the core back portion 41 of the stator core 45 preferably is a cylindrical or a substantially cylindrical shape which is concentric with the shaft 31.

The teeth portion 42 of the stator core 45 extends toward the shaft 31 from a core back inner side surface 41b (refer to FIG. 15) of the core back portion 41. A second gap 83 is provided between an extended tip of the teeth portion 42 and the rotor magnet 33. That is, the second gap 83 is present between the teeth portion 42 and the rotor 30. A plurality of teeth portions 42 are provided and the plurality of teeth portions 42 are disposed at equal or substantially equal intervals in a circumferential direction of the core back inner side surface 41b of the core back portion 41.

In addition, in this specification, the second gap is a gap provided between a teeth portion of a stator and a rotor portion.

The coil portion 43 is configured with an electrically-conducting wire 43a. The electrically-conducting wire 43a is wound around the bobbin 44. The bobbin 44 is preferably mounted on each of the teeth portions 42. In this way, the bobbin 44 is interposed between at least the stator core 45 and the coil portion 43.

The bobbin 44 preferably includes a bobbin main body portion 44e, an inner bobbin protrusion portion (an insulator protrusion portion) 44a, and an outer bobbin protrusion portion (an insulator protrusion portion) 44b.

The bobbin main body portion 44e is a portion around which the electrically-conducting wire 43a is wound.

The inner bobbin protrusion portion 44a is preferably provided at an end portion on the inside in the radial direction of the bobbin main body portion 44e. The outer bobbin protrusion portion 44b is preferably provided at an end portion on the outside in the radial direction of the bobbin main body portion 44e. The inner bobbin protrusion portion 44a and the outer bobbin protrusion portion 44b extend from the bobbin main body portion 44e to the rear side (the +Z side) in the axial direction. That is, the inner bobbin protrusion portion 44a and the outer bobbin protrusion portion 44b are provided on the rear side (the +Z side) of the stator core 45 and extend in the axial direction (the Z-axis direction). The coil portion 43 is provided between the inner bobbin protrusion portion 44a and the outer bobbin protrusion portion 44b.

Figure 8:
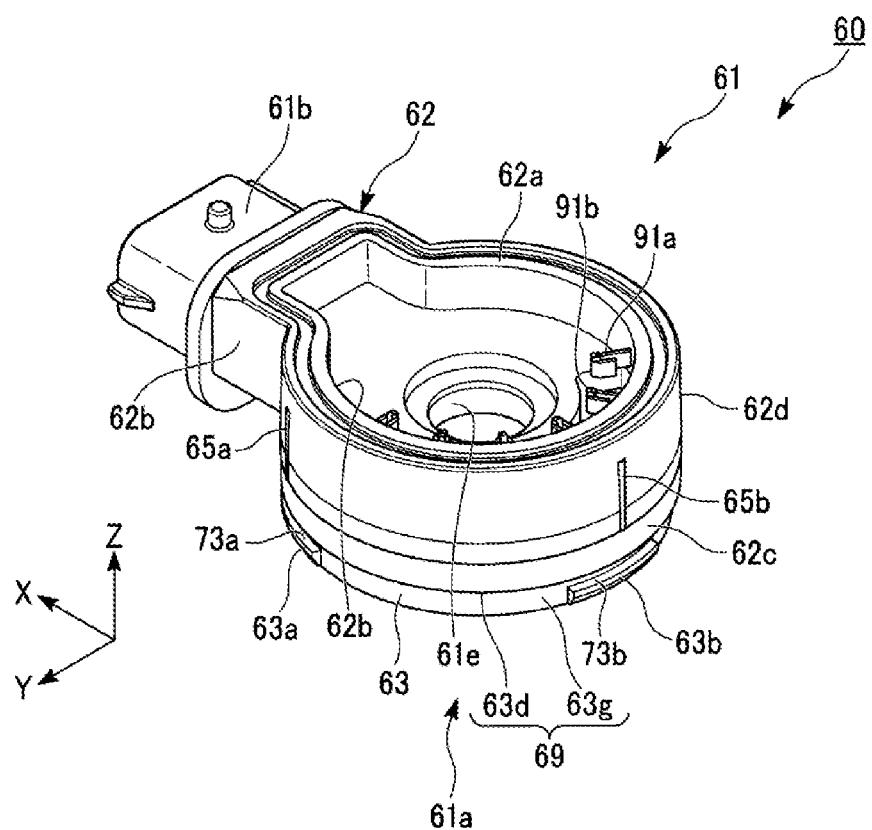
FIG. 8 is a perspective view showing a bus bar portion in the first preferred embodiment of the present invention.
Figure 9:
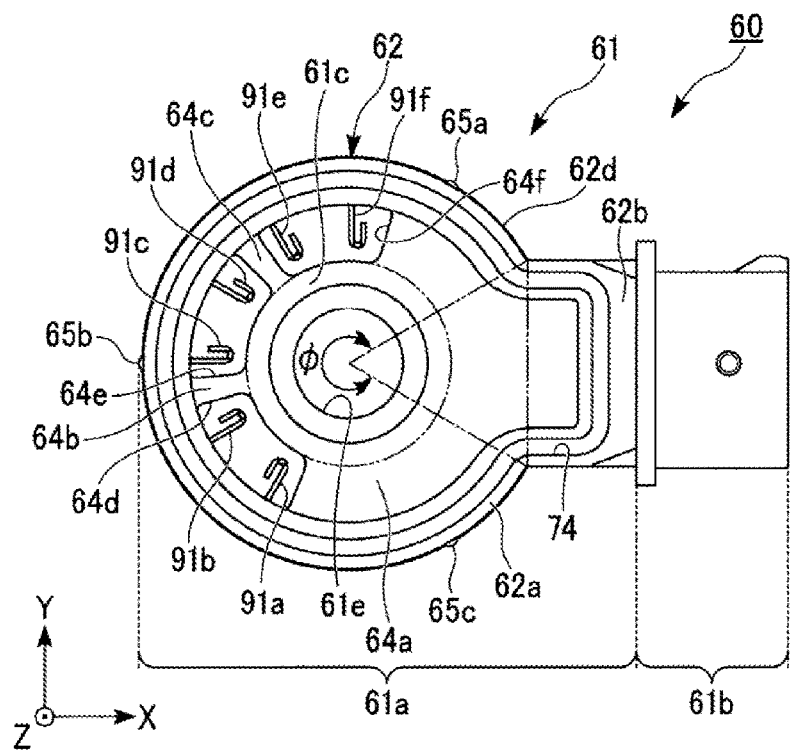
FIG. 9 is a plan view showing the bus bar portion in the first preferred embodiment of the present invention.
Figure 10:
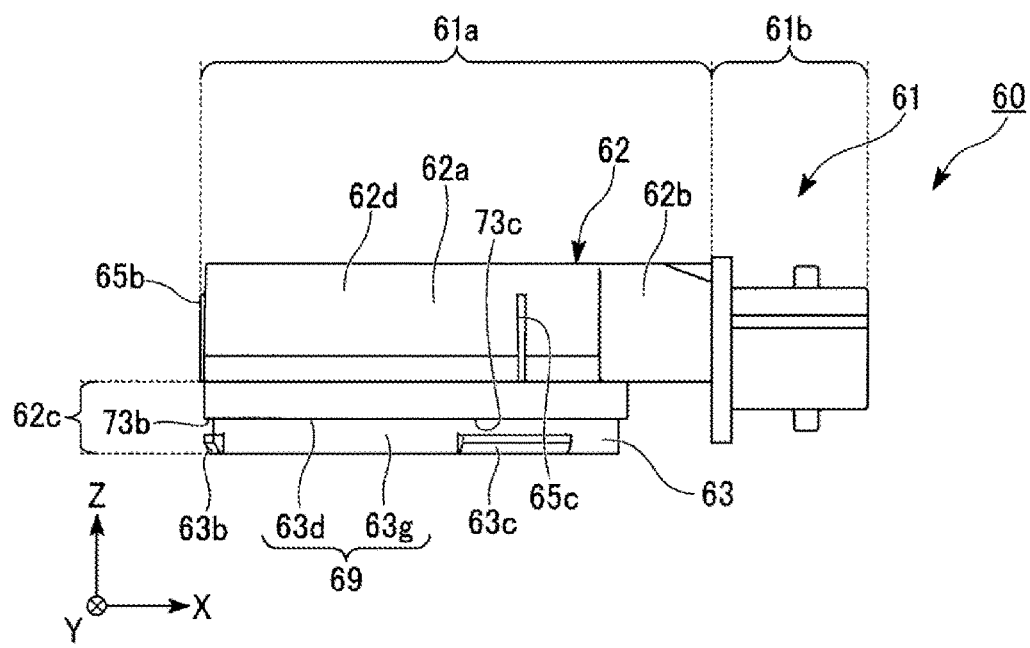
FIG. 10 is a side view showing the bus bar portion in the first preferred embodiment of the present invention.
Figure 11:
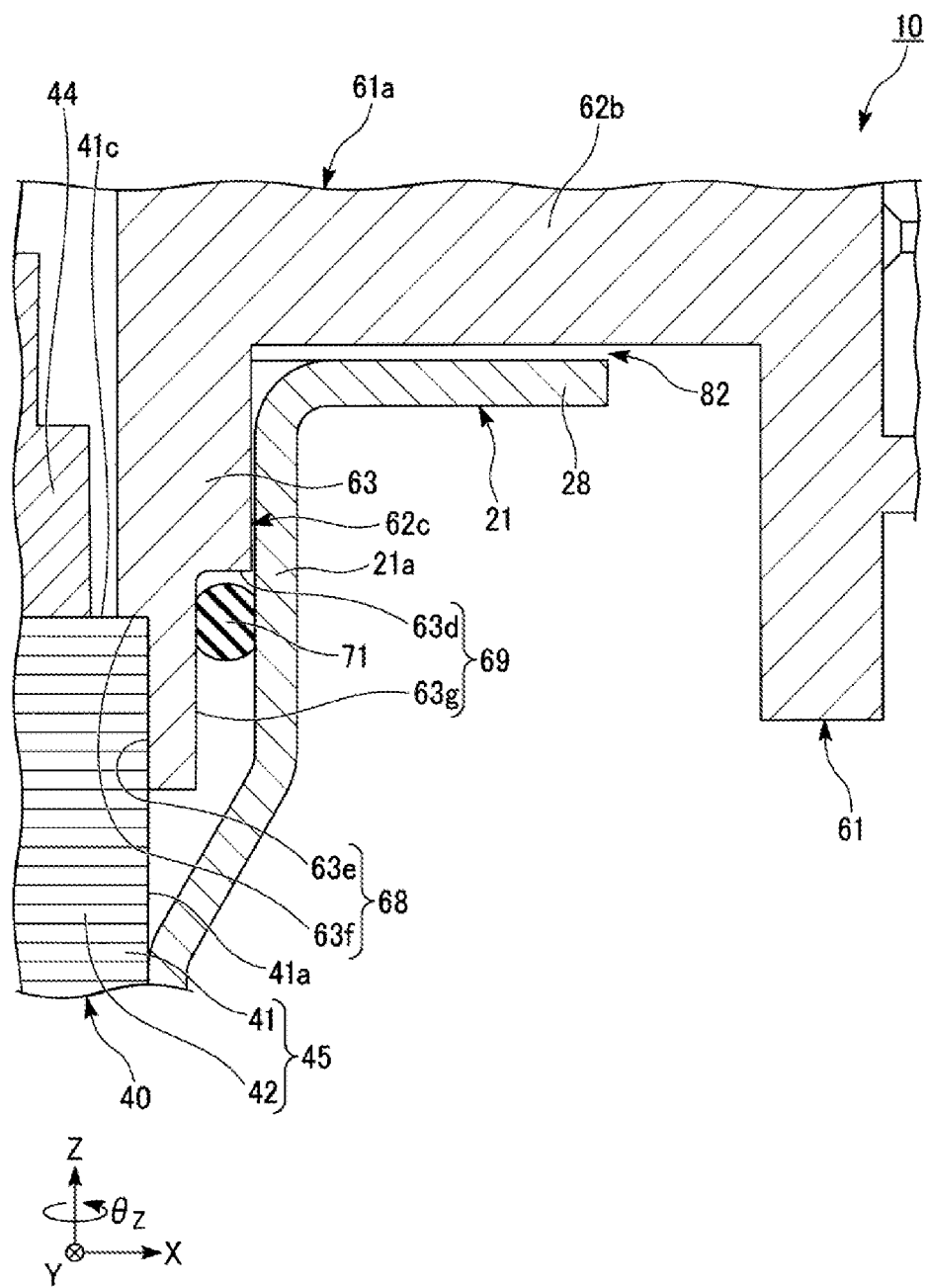
FIG. 11 is a partially enlarged cross-sectional view showing the motor according to the first preferred embodiment of the present invention.
Figure 12:
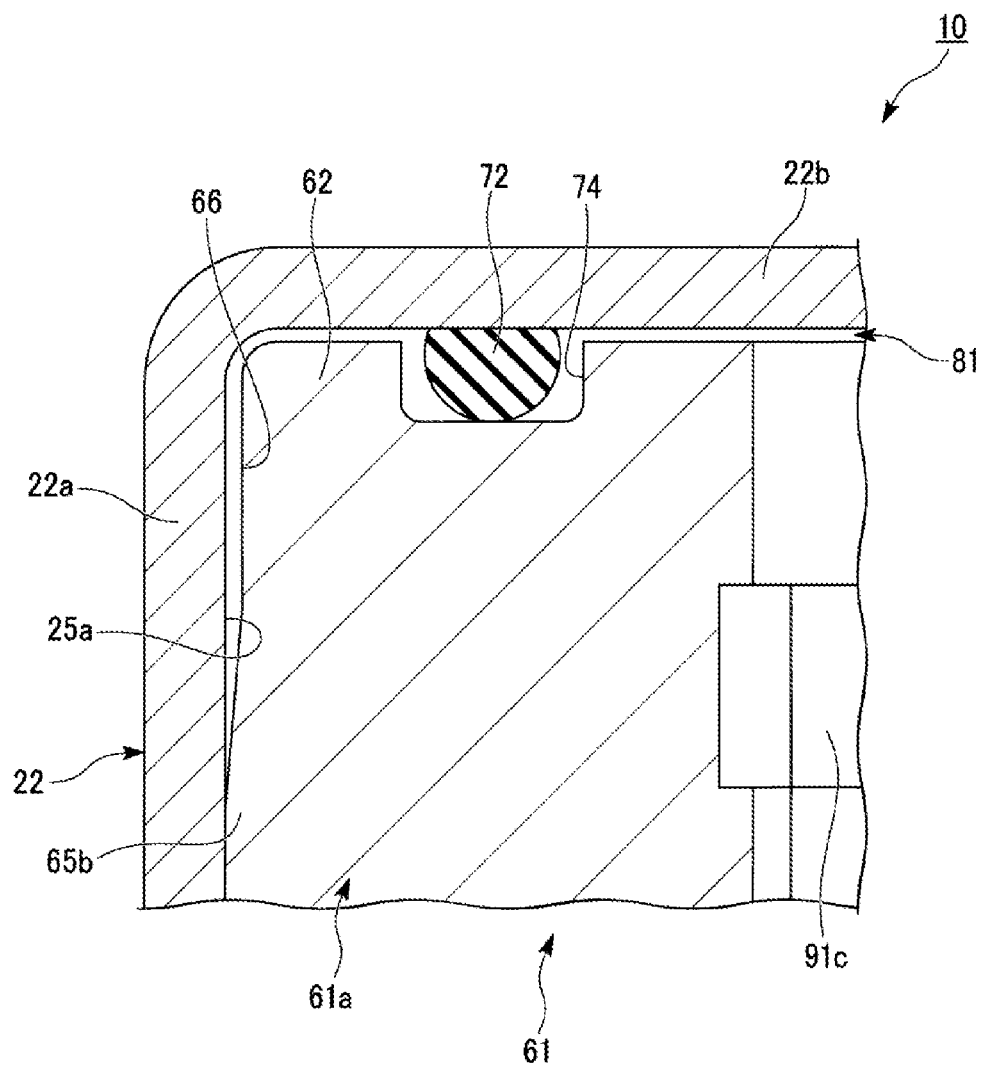
FIG. 12 is a partially enlarged cross-sectional view showing the motor according to the first preferred embodiment of the present invention.

FIGS. 8 to 10 are diagrams showing the bus bar portion 60. FIG. 8 is a perspective view. FIG. 9 is a plan view. FIG. 10 is a side view. The bus bar portion 60 shown in FIGS. 8 to 10 is shown in a state of not being retained in the housing 20. FIGS. 11 and 12 are partially enlarged cross-sectional views showing the motor 10. The cross-sections shown in FIG. 11 and are cross-sections passing through the teeth portion 42 of the stator 40, similar to the cross-section shown in FIG. 1.

The bus bar portion 60 is configured to supply an electrical drive current to the stator 40. The bus bar portion 60 preferably includes a coil connection bus bar (a bus bar) 91, a sensor connection bus bar 92, and a bus bar holder 61, as shown in FIGS. 1, 8, and 9.

The coil connection bus bar 91 is a bus bar which is electrically connected to the stator 40 and supplies a drive current to the stator 40. Although illustration is omitted, a plurality of the coil connection bus bars 91 are preferably provided. One end of each of the coil connection bus bars 91 is provided to protrude from the bottom surface of an opening portion of a power supply 67 of a connector portion 61b (described later) and is exposed to the outside of the housing 20. An external power supply is connected to one end of the coil connection bus bar 91 exposed to the outside.

Coil connection portions 91a, 91b, 91c, 91d, 91e, and 91f are preferably provided at the other ends of the plurality of coil connection bus bars 91. The coil connection portions 91a to 91f are provided to protrude from the inner circumferential surface of the outer shell portion 62 of the bus bar holder 61 (described later) and are respectively electrically connected to the corresponding coil portions 43 of the stator 40, although illustration is omitted. In this way, the coil connection bus bar 91 and the stator 40 are electrically connected.

The sensor connection bus bar 92 is preferably a bus bar which is electrically connected to various sensors such as, for example, a Hall sensor (not shown) and supplies an electric current to the various sensors. The various sensors are, for example, magnetic sensors, optical sensors, temperature sensors, acceleration sensors, or the like. Although illustration is omitted, a plurality of the sensor connection bus bars 92 are provided. One end of each of the sensor connection bus bars 92 is provided to protrude from the bottom surface of the opening portion of a power supply 67 of the connector portion 61b (described later) and is exposed to the outside. An external power supply is connected to one end of the sensor connection bus bar 92 exposed to the outside. The other ends of the sensor connection bus bars 92 are connected to various sensors.

The bus bar holder 61 is preferably a holder made of electrically insulated resin, which supports the coil connection bus bar 91 and the sensor connection bus bar 92. The rear side (the +Z side) of the bus bar holder 61 is preferably accommodated in the bus bar holder press-fitting portion 22a of the rear housing portion 22, as shown in FIG. 1. The front side (the −Z side) of the bus bar holder 61 is preferably accommodated in the bus bar holder insertion portion 21a of the front housing portion 21.

A material defining the bus bar holder 61 is not particularly limited as far as it has an electrically insulating property. The bus bar holder 61 is preferably manufactured as a single component by, for example, injection molding. The bus bar holder 61 preferably includes the main body portion 61a, the connector portion 61b, and a rear bearing retaining portion (a second bearing retaining portion) 61c, as shown in FIGS. 1 and 8 to 10.

The main body portion 61a preferably has a tubular shape. The main body portion 61a preferably includes the outer shell portion 62, connection portions 64a, 64b, and 64c, and a plurality of protrusion portions (contact portions), as shown in FIG. 9. In this preferred embodiment, three or more of the protrusion portions are preferably provided. As an example, in FIG. 9, an example is shown in which as the plurality of protrusion portions, three protrusion portions (contact portions) 65a, 65b, and 65c are provided. That is, the protrusion portions 65a to 65c are provided in the main body portion 61a.

The outer shell portion 62 is a tubular portion surrounding the central axis J in the circumferential direction. A rear side groove portion of an O-ring 74 is present in an end surface on the rear side (the +Z side) of the outer shell portion 62 along the outer shape of the outer shell portion 62. The rear side O-ring 72 is fitted into the rear side groove portion of the O-ring 74.

The outer shell portion 62 is separated from the lid portion 22b in the axial direction (the Z-axis direction), as shown in FIG. 12. That is, a third gap 81 is preferably provided between the outer shell portion 62 and the lid portion 22b. In other words, the third gap 81 is provided between the main body portion 61a and the lid portion 22b.

In addition, in this specification, the third gap 81 is a gap which is interposed between the main body portion 61a and the lid portion 22b.

The outer shell portion 62 preferably includes a housing accommodation outer peripheral portion 62a, a connector connection portion 62b, and an O-ring retaining portion 62c. That is, the main body portion 61a includes the housing accommodation outer peripheral portion 62a, the connector connection portion 62b, and the O-ring retaining portion 62c.

The shape of the cross-section (the X-Y cross-section) perpendicular to the central axis J and the shape in a plan view (an X-Y plane view) of the housing accommodation outer peripheral portion 62a preferably are an arc shape which is concentric with the rear bearing retaining portion 61c and has a central angle φ of greater than or equal to about 240°, for example, as shown in FIG. 9.

In this preferred embodiment, the housing accommodation outer peripheral portion 62a is press-fitted into the bus bar holder press-fitting portion 22a of the rear housing portion 22. That is, the housing accommodation outer peripheral portion 62a is preferably, for example, press-fitted into the housing 20. In this way, the bus bar portion 60 is press-fitted on the inside of the housing 20. In this preferred embodiment, the housing accommodation outer peripheral portion 62a is press-fitted into only the rear housing portion 22.

The connector connection portion 62b is a portion which is connected to the connector portion 61b. The connector connection portion 62b is connected to both end portions of the housing accommodation outer peripheral portion 62a and has a shape which is convex to the connector portion 61b side (the +X side). The connector connection portion 62b is inserted into the opening portion of a connector 26 and exposed to the outside. That is, the connector connection portion 62b protrudes radially outward from the inside of the bus bar holder insertion portion 21a.

The connector connection portion 62b is separated from the front side flange portion 28 which is an end portion on the rear side (the +Z side) of the front housing portion 21, in the axial direction (the Z-axis direction), as shown in FIG. 11. That is, a fourth gap 82 is provided between the end portion on the rear side (the +Z side) of the bus bar holder insertion portion 21a and the connector connection portion 62b.

In addition, the fourth gap 82 is preferably a gap which is interposed between the main body portion 61a and the lid portion 22b.

The O-ring retaining portion 62c retains the front side O-ring 71. The O-ring retaining portion 62c is provided on the front side (the −Z side) of the housing accommodation outer peripheral portion 62a, as shown in FIGS. 8 and 10. The O-ring retaining portion 62c is located at an end portion on the front side of the outer shell portion 62. That is, the main body portion 61a preferably includes the O-ring retaining portion 62c on the front side. The O-ring retaining portion 62c preferably includes an O-ring retaining portion main body 63 and convex portions 63a, 63b, and 63c.

The O-ring retaining portion main body 63 preferably has a cylindrical shape which is concentric with the housing accommodation outer peripheral portion 62a. A small-diameter stepped portion 69 in which a diameter is further reduced toward the front side is provided on the front side (the −Z side) of the outer circumferential surface along the direction around the axis (the $\theta_z$ direction) of the O-ring retaining portion main body 63. The small-diameter stepped portion 69 preferably includes a small-diameter portion side surface (a second side surface) 63g which is a portion of the outer circumferential surface of the O-ring retaining portion main body 63, that is, the O-ring retaining portion 62c, and a small-diameter portion step surface (a second end surface) 63d intersecting the small-diameter portion side surface 63g.

The small-diameter portion side surface 63g and the small-diameter portion step surface 63d are connected to each other. In this preferred embodiment, the small-diameter portion step surface 63d is a flat surface and is perpendicular or substantially perpendicular to the axial direction (the Z-axis direction). In this preferred embodiment, the small-diameter portion side surface 63g is parallel or substantially parallel to the axial direction.

In this preferred embodiment, the front side O-ring 71 out of the front side O-ring 71 and the rear side O-ring 72 is retained in the small-diameter stepped portion 69. That is, a portion of an O-ring of the motor 10 is retained in the small-diameter stepped portion 69.

In addition, a "portion" of an O-ring as discussed herein includes both some O-rings among all O-rings provided in a plurality and also a portion of a single O-ring.

As shown in FIG. 11, a large-diameter stepped portion 68 in which a diameter further increases toward the front side is provided on the front side (the −Z side) of the inner circumferential surface of the O-ring retaining portion main body 63. That is, the main body portion 61a includes the large-diameter stepped portion 68. The large-diameter stepped portion includes a large-diameter portion step surface (a first end surface) 63f extending in the radial direction, and a large-diameter portion side surface (a first side surface) 63e extending in the axial direction (the Z-axis direction). In other words, the main body portion 61a preferably includes the large-diameter portion step surface 63f and the large-diameter portion side surface 63e. In this preferred embodiment, the large-diameter portion step surface 63f and the large-diameter portion side surface 63e are connected.

The large-diameter portion step surface 63f is a portion of the inner circumferential surface of the O-ring retaining portion main body 63. The large-diameter portion step surface 63f extends radially inward from the large-diameter portion side surface 63e. In this preferred embodiment, the large-diameter portion step surface 63f is preferably a flat surface. The large-diameter portion step surface 63f is perpendicular or substantially perpendicular to, for example, the axial direction (the Z-axis direction). The large-diameter portion step surface 63f is in contact with a core back end surface (an end surface) 41c on the rear side (the +Z side) of the core back portion 41. That is, the large-diameter portion step surface 63f is in contact with the core back end surface 41c on the rear side (the +Z side) of the stator core 45.

The large-diameter portion side surface 63e is preferably located on the outside in the radial direction of the large-diameter portion step surface 63f and extends from the large-diameter portion step surface 63f to the front side (the −Z side). In this preferred embodiment, the large-diameter portion side surface 63e is a surface along the core back outer side surface 41a of the core back portion 41. In other words, in this preferred embodiment, the large-diameter portion side surface 63e is a surface of the side surface of the stator 40. The dimension in the axial direction (the Z-axis direction) of the large-diameter portion side surface 63e is larger than the dimension in the radial direction of the large-diameter portion step surface 63f.

In addition, the expression, extending in the axial direction, includes not only a case of extending strictly in the axial direction (the Z-axis direction), but also a case of extending in a direction inclined in a range of less than about 45° with respect to the axial direction.

Further, the expression, extending in the radial direction, includes not only a case of extending strictly in the radial direction, that is, a direction perpendicular or substantially perpendicular to the axial direction (the Z-axis direction), but also a case of extending in a direction inclined in a range of less than about 45° with respect to the radial direction.

In this preferred embodiment, although illustration is omitted, the large-diameter portion side surface 63e is preferably slightly inclined in a direction to be separated from the stator 40 as it goes toward the front side (the −Z side). The inclination angle of the large-diameter portion side surface 63e is less than or equal to about 1° with respect to, for example, the axial direction (the Z-axis direction). In this way, the diameter of the large-diameter stepped portion 68, that is, the inner diameter of the O-ring retaining portion main body 63 at the position of the large-diameter portion side surface 63e gradually increases toward the front side (the −Z side). In other words, the inner diameter of the O-ring retaining portion main body 63 is made so as to become wider toward an end portion on the front side (the −Z side), that is, an opening end.

The large-diameter portion side surface 63e which is the inner circumferential surface of the O-ring retaining portion main body 63 contacts the core back outer side surface (the outer side surface) 41a on the outside in the radial direction of the core back portion 41 or faces the core back outer side surface 41a with a first gap (not shown) interposed therebetween. The core back outer side surface 41a is the side surface of the stator core 45. That is, the large-diameter portion side surface 63e contacts the side surface of the stator core 45 or faces the side surface of the stator core 45 with the first gap interposed therebetween.

In addition, the first gap is preferably a gap which is interposed between the main body portion 61a and the stator core 45.

Further, the end surface on the rear side of the stator 40 preferably includes the end surface on the rear side of the stator core 45 and the end surface on the rear side of the stator of the bobbin 44.

Further, the side surface of the stator 40 preferably includes the surface of the stator 40 intersecting the radial direction and includes the surface provided on the inside in the radial direction or on the outside in the radial direction of the stator core 45 in the stator 40, the surface provided on the inside in the radial direction or on the outside in the radial direction of the bobbin 44 in the stator 40, or the like. Further, the side surface of the stator 40 also preferably includes, in a case where the stator core 45 in the stator 40 includes a hole, a groove, or the like, the surface intersecting the radial direction, of the inner wall surface of the hole, the groove, or the like.

Further, the expression, a surface and a surface coming into contact with each other or a surface and a surface facing each other with a gap interposed therebetween, includes a state where a surface and a surface are in contact with each other without a gap overall, and a state where a surface and a surface contact each other in one portion and face each other with a gap interposed therebetween in another portion, and a state where a surface and a surface face each other with a gap interposed therebetween overall.

In this preferred embodiment, the large-diameter portion side surface 63e and the core back outer side surface 41a of the core back portion 41 are fitted to each other in, for example, a clearance-fit. That is, the first gap is preferably interposed at least partially between the large-diameter portion side surface 63e and the core back outer side surface 41a of the core back portion 41.

In this preferred embodiment, the dimension in the radial direction of the first gap which is interposed between the large-diameter portion side surface 63e and the core back outer side surface 41a of the core back portion 41 is preferably smaller than a dimension W3 in the radial direction of the second gap 83 which is interposed between the teeth portion 42 and the rotor magnet 33 shown in FIG. 1.

In addition, the dimension in the radial direction of the first gap includes a radial dimension in a portion in which a dimension in the radial direction is the maximum, of the first gap.

Further, the dimension in the radial direction of the second gap includes a radial dimension in a portion in which a dimension in the radial direction is the minimum, of the second gap.

The convex portions 63*a*, 63*b*, and 63*c* protrude radially outward from the small-diameter portion side surface 63*g*, as shown in FIGS. 8 and 10. The convex portions 63*a*, 63*b*, and 63*c* are provided at positions separated from the small-diameter portion step surface 63*d*. In other words, the convex portions 63*a*, 63*b*, and 63*c* are provided on the small-diameter portion side surface 63*g* at positions separated from the small-diameter portion step surface 63*d* of the small-diameter stepped portion 69.

The convex portions 63*a*, 63*b*, and 63*c* extend in the circumferential direction of the O-ring retaining portion main body 63. The convex portions 63*a*, 63*b*, and 63*c* are disposed at equal or substantially equal intervals in the circumferential direction of the small-diameter portion side surface 63*g*. In a plan view (an X-Y plane view), the center positions in the circumferential direction of the convex portions 63*a*, 63*b*, and 63*c* respectively are preferably the same positions as the positions where the protrusion portions 65*a*, 65*b*, and 65*c* are provided.

Each of front side groove portions of O-rings 73*a*, 73*b*, and 73*c* is defined by the surface on the rear side (the +Z side) of each of the convex portions 63*a*, 63*b*, and 63*c*, the small-diameter portion step surface 63*d*, and the small-diameter portion side surface 63*g* which is a portion of the outer circumferential surface of the O-ring retaining portion main body 63. The front side O-ring 71 is fitted into the front side groove portions for the O-rings 73*a*, 73*b*, and 73*c*.

The connection portions 64*a*, 64*b*, and 64*c* connect the outer shell portion 62 and the rear bearing retaining portion 61*c* provided inside the outer shell portion 62.

The connection portion 64*a* is preferably connected over half or approximately half of the outer circumference of the rear bearing retaining portion 61*c*.

Each of the connection portions 64*b* and 64*c* preferably has an elongated shape. The connection portions 64*b* and 64*c* are connected to divide a portion which is not connected to the connection portion 64*a*, of the outer circumference of the rear bearing retaining portion 61*c*, into three or approximately three along with the connection portion 64*a*.

Gaps 64*d*, 64*e*, and 64*f* are provided between the rear bearing retaining portion 61*c* and the outer shell portion 62. That is, the main body portion 61*a* includes the gaps 64*d*, 64*e*, and 64*f*.

The gap 64*d* is defined by the connection portion 64*a*, the connection portion 64*b*, the outer shell portion 62, and the rear bearing retaining portion 61*c*. The gap 64*e* is defined by the connection portion 64*b*, the connection portion 64*c*, the outer shell portion 62, and the rear bearing retaining portion 61*c*. The gap 64*f* is defined by the connection portion 64*c*, the connection portion 64*a*, the outer shell portion 62, and the rear bearing retaining portion 61*c*.

The position at which the gap 64*d* is provided is a position which includes the coil connection portions 91*a* and 91*b* in a plan view. The position at which the gap 64*e* is provided is a position which includes the coil connection portions 91*c* and 91*d* in a plan view. The position at which the gap 64*f* is provided is a position which includes the coil connection portions 91*e* and 91*f* in a plan view.

Figure 13A:
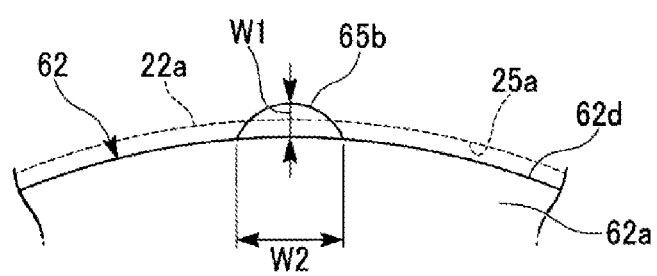
FIG. 13A is a plan view showing a protrusion portion in the first preferred embodiment of the present invention.
Figure 13B:
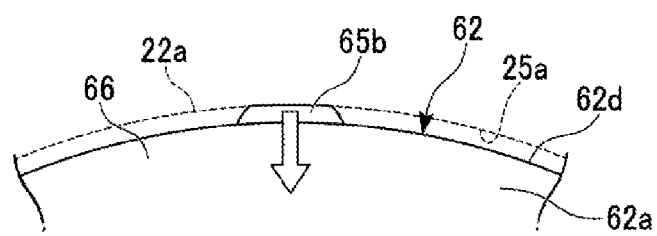
FIG. 13B is a plan view showing the protrusion portion in the first preferred embodiment of the present invention.
Figure 13B:
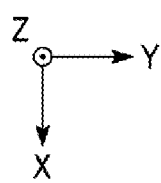

FIGS. 13A and 13B are plan views showing the protrusion portion 65*b*. FIG. 13A is a diagram showing a state where the main body portion 61*a* is not press-fitted into the bus bar holder press-fitting portion 22*a*. FIG. 13B is a diagram showing a state where the main body portion 61*a* is press-fitted into the bus bar holder press-fitting portion 22*a*.

The protrusion portions 65*a* to 65*c* are preferably provided on an outer circumferential surface 62*d* having a cylindrical or substantially cylindrical surface shape along the direction around the axis (the $\theta_z$ direction) of the housing accommodation outer peripheral portion 62*a*, as shown in FIGS. 8 to 10 and 13A. The protrusion portions 65*a* to 65*c* protrude radially outward from the outer circumferential surface 62*d*. The protrusion portions 65*a* to 65*c* preferably extend along the axial direction (the Z-axis direction) of the shaft 31, that is, the central axis J. The shape of the cross-section (the X-Y cross-section) of each of the protrusion portions 65*a* to 65*c* is not particularly limited and may be a semicircular shape, a semi-elliptical shape, a rectangular shape, or a polygonal shape. In this preferred embodiment, the cross-sectional shape of each of the protrusion portions 65*a* to 65*c* is preferably, for example, a semi-elliptical shape.

In this preferred embodiment, the protrusion portions 65*a* to 65*c* are provided between the front side O-ring 71 and the rear side O-ring 72 in the axial direction (the Z-axis direction) of the shaft 31.

The protrusion portion 65*b* is provided at an end portion of the housing accommodation outer peripheral portion 62*a* on the side (the −X side) opposite to the side where the connector connection portion 62*b* is provided, of the rear bearing retaining portion 61*c*.

The protrusion portions 65*a* and 65*c* are provided at positions which divide the circumferential direction of the housing accommodation outer peripheral portion 62*a* into approximately three along with the protrusion portion 65*b*. That is, the plurality of protrusion portions 65*a* to 65*c* are disposed at equal or substantially equal intervals in the circumferential direction of the housing accommodation outer peripheral portion 62*a*.

In addition, the "equal interval" includes not only a case where the circumferential distances between the protrusion portions adjacent to each other are exactly the same, but also a case where the circumferential distances are different from each other within a design error range. Specifically, the equal interval includes, for example, a case where the ratio between the circumferential distances between the protrusion portions adjacent to each other is greater than or equal to about 0.9 and less than or equal to about 1.1, for example.

A protrusion height W1 and a width W2 of the protrusion portion 65*b* shown in FIG. 13A are, in this preferred embodiment, uniform throughout the axial direction (the Z-axis direction). The protrusion portion 65*b* preferably has a height which protrudes outward from the inner diameter of the bus bar holder press-fitting portion 22*a* in a state where the main body portion 61*a* is not press-fitted. The same applies to the protrusion portions 65*a* and 65*c*. The outer circumferential surface 62*d* of the housing accommodation outer peripheral portion 62*a* is located inside the inner circumferential surface 25*a* of the bus bar holder press-fitting portion 22*a*.

In this preferred embodiment, in a state where the main body portion 61*a* is press-fitted, the protrusion portion 65*b* contacts the inner circumferential surface 25*a* and receives stress from the inner circumferential surface 25*a*, as shown in FIGS. 12 and 13B. That is, the protrusion portion 65*b* contacts the rear housing portion 22 and receives stress from the inner circumferential surface of the housing 20. In this way, the protrusion portion 65*b* is elastically deformed. In this preferred embodiment, since the protrusion portions 65*a* to 65*c* are disposed at equal or substantially equal intervals in the circumferential direction of the housing accommodation outer peripheral portion 62*a*, the protrusion portions 65*a* to 65*c* are equally elastically deformed. The same applies to the protrusion portions 65*a* and 65*c*.

In this preferred embodiment, the inner circumferential surface 25*a* and the main body portion 61*a* are preferably in contact with each other at the protrusion portions 65*a* to 65*c*. In this way, a non-contact portion 66 which is separated from the inner circumferential surface 25*a* is provided on the outer circumferential surface 62*d* of the housing accommodation outer peripheral portion 62*a*. That is, the non-contact portion 66 is separated from the inner circumferential surface of the housing 20.

The connector portion 61*b* is a portion which is connected to an external power supply (not shown). The connector portion 61*b* extends toward the outside (the +X side) in the radial direction of the shaft 31 from a portion of the outer circumferential surface of the connector connection portion 62*b* and has a tubular shape which is preferably a rectangular or substantially rectangular parallelepiped which is open to the outside (the +X side) in the radial direction, as shown in FIGS. 1 and 8 to 10. The entirety of the connector portion 61*b* of the bus bar holder 61 is preferably exposed to the outside of the housing 20 through the opening portion of a connector 26.

The opening portion of a power supply 67 which is open to one side (the +X side) in the length direction of the bus bar holder 61 is present in the connector portion 61*b*. On the bottom surface of the opening portion of a power supply 67, as described above, the coil connection bus bar 91 and the sensor connection bus bar 92 are provided to protrude.

The rear bearing retaining portion 61*c* is preferably provided inside the outer shell portion 62. The rear bearing retaining portion 61*c* retains the rear bearing 52. The shape in a plan view (an X-Y plane view) of the rear bearing retaining portion 61*c* is preferably a circular or substantially circular shape, and the central axis J passes through the center of the rear bearing retaining portion 61*c* in a plan view. The rear bearing retaining portion 61*c* includes a central hole 61*e* which is concentric with the central axis J.

The front side O-ring 71 is provided inside the front housing portion 21. The front side O-ring 71 is retained in the O-ring retaining portion 62*c* of the bus bar holder 61. Specifically, the front side O-ring 71 is fitted into the front side groove portions of an O-ring 73*a*, 73*b*, and 73*c* and retained in the small-diameter portion side surface 63*g* in the outer circumferential surface of the O-ring retaining portion main body 63. In other words, the front side O-ring 71 is provided between the front housing portion 21 and the bus bar holder 61.

The front side O-ring 71 is in contact with the inner circumferential surface of the front housing portion 21 (the housing portion on the other side), more specifically, the inner circumferential surface of the bus bar holder insertion portion 21*a*, and the outer circumferential surface of the main body portion 61*a*, more specifically, the small-diameter portion side surface 63*g* of the O-ring retaining portion 62*c*, over a circumference. That is, the front side O-ring 71 preferably contacts the main body portion 61*a* and the housing 20 over a circumference. The front side O-ring 71 receives stress from the inner circumferential surface of the bus bar holder insertion portion 21*a*.

The front side O-ring 71 is disposed farther to the front housing portion 21 side (the −Z side, the side of the housing portion on the other side) than the protrusion portions 65*a* to 65*c*. That is, the front side O-ring 71 is disposed at a position different from the protrusion portions 65*a* to 65*c*.

As shown in FIG. 11, in this preferred embodiment, an end portion on the front side (the −Z side) in the axial direction (the Z-axis direction) of the front side O-ring 71 is located farther to the front side than an end portion on the rear side (the +Z side) in the axial direction of the stator 40, that is, the core back end surface 41*c* of the core back portion 41. In other words, a portion on the front side of the front side O-ring 71 is disposed in a range in which the stator 40 and the main body portion 61*a* overlap each other in the axial direction.

The rear side O-ring 72 is provided inside the rear housing portion 22. The rear side O-ring 72 is fitted into the rear side groove portion for the O-ring 74 which is located at the outer shell portion 62 of the main body portion 61*a*. That is, the rear side O-ring 72 is disposed on the rear side (the +Z side) in the axial direction (the Z-axis direction) of the outer shell portion 62. In other words, the rear side O-ring 72 is provided between the rear housing portion 22 and the bus bar holder 61.

The whole circumference of the rear side O-ring 72 is in contact with the surface on the front side (the −Z side) of the lid portion 22*b* of the rear housing portion 22. That is, the rear side O-ring 72 is in contact with the main body portion 61*a* and the housing 20 over a circumference. The rear side O-ring 72 receives stress from the surface on the front side (the −Z side) of the lid portion 22*b*.

The rear side O-ring 72 is disposed farther to the back side (the +Z side) than the protrusion portions 65*a* to 65*c* of the bus bar holder press-fitting portion 22*a* of the rear housing portion 22 in the axial direction (the Z-axis direction). That is, the rear side O-ring 72 is disposed at a position different from the protrusion portions 65*a* to 65*c*.

The front side O-ring 71 and the rear side O-ring 72 are preferably disposed at positions different from the positions where the protrusion portions 65*a* to 65*c* are provided, in the axial direction (the Z-axis direction) of the shaft 31. In this preferred embodiment, the joint surface between the front housing portion 21 and the rear housing portion 22 is located between the front side O-ring 71 and the rear side O-ring 72 in the axial direction (the Z-axis direction).

The configurations of the front side O-ring 71 and the rear side O-ring 72 are not particularly limited and any desirable type of O-ring may be used. In this preferred embodiment, each of the front side O-ring 71 and the rear side O-ring 72 is preferably a member made by processing, for example, elongated silicone rubber having a round cross-section, into a ring shape.

The front bearing 51 is retained in the front bearing retaining portion 21*c* of the front housing portion 21. That is, the front bearing 51 is disposed on the front side (the −Z side) of the stator 40.

The rear bearing 52 is retained in the rear bearing retaining portion 61*c* of the bus bar holder 61. That is, the rear bearing 52 is disposed on the rear side (the +Z side) of the stator 40.

The stator 40 is disposed between the front bearing 51 and the rear bearing 52 in the axial direction (the Z-axis direction). The front bearing 51 and the rear bearing 52 support the shaft 31 of the rotor 30.

The configurations of the front bearing 51 and the rear bearing 52 are not particularly limited and any desirable bearing may be used.

The oil seal 80 is preferably mounted on the inside of the oil seal retaining portion 21*d* in the direction around the axis (the $\theta_z$ direction) of the shaft 31. The oil seal 80 prevents water, oil, or the like from infiltrating into the housing 20 from between the oil seal retaining portion 21*d* of the front housing portion 21 and the shaft 31. The configuration of the oil seal 80 is not particularly limited and any desirable oil seal may be used.

An external power supply is connected to the motor 10 through the connector portion 61*b*. The connected external power supply is electrically connected to the coil connection bus bar and the sensor connection bus bar 92 protruding from the bottom surface of the opening portion of a power supply 67 which the connector portion 61*b* has. In this way, a drive current is supplied to the coil portion 43 of the stator 40 and various sensors (not shown) through the coil connection bus bar 91 and the sensor connection bus bar 92. The drive current which is supplied to the coil portion 43 is controlled according to the rotational position of the rotor 30 which is measured by, for example, a magnetic sensor among various sensors. If the drive current is supplied to the coil portion 43, a magnetic field is generated and the rotor 30 having the shaft 31 is rotated by the magnetic field. In this way, the motor 10 obtains a rotational drive force.

Next, the procedure of assembling the motor 10 according to this preferred embodiment will be described.

First, the front bearing 51, the stator 40, and the rotor 30 are preferably retained in the front housing portion 21. Specifically, the front bearing 51 is retained in the front bearing retaining portion 21*c* of the front housing portion 21. The outer circumferential surface of the stator 40 is fitted to the inner circumferential surface 23 of the stator retaining portion 21*b* of the front housing portion 21, such that the stator 40 is fixed. The shaft 31 of the rotor 30 is preferably inserted into the front bearing 51, such that the rotor 30 is supported through the front bearing 51.

Next, the rear bearing 52 is preferably retained in the rear bearing retaining portion 61*c* of the bus bar portion 60 and the front side O-ring 71 and the rear side O-ring 72 are respectively fitted into the front side groove portions of an O-ring 73*a*, 73*b*, and 73*c* and the rear side groove portion for the O-ring 74.

Next, the bus bar portion 60 is preferably inserted from the front side opening portion 24 into the bus bar holder insertion portion 21*a* in the front housing portion 21. At this time, an operation is performed such that an end portion on the rear side (the +Z side) of the shaft 31 is inserted into the rear bearing 52 retained in the bus bar portion 60. In this way, the shaft 31 of the rotor 30 enters a state where both ends thereof are supported by the front bearing 51 and the rear bearing 52.

The O-ring retaining portion 62*c* of the main body portion 61*a* is preferably inserted into the bus bar holder insertion portion 21*a* of the front housing portion 21. At this time, the large-diameter portion side surface 63*e* in the inner circumferential surface of the O-ring retaining portion 62*c* is fitted to the side surface on the outside in the radial direction of the stator 40, that is, the core back outer side surface 41*a* of the core back portion 41, and the large-diameter portion end surface 63*f* contacts the core back end surface 41*c* of the core back portion 41 in the stator 40.

The large-diameter portion side surface 63*e* is fitted to the core back outer side surface 41*a* of the core back portion 41, such that the radial position of the main body portion 61*a* of the bus bar holder 61 is determined. That is, the main body portion 61*a* is positioned by the stator 40 in the radial direction of the shaft 31.

The front side O-ring 71 provided on the outer circumferential surface of the O-ring retaining portion 62*c* preferably contacts the inner circumferential surface of the bus bar holder insertion portion 21*a* and receives stress. In this way, the main body portion 61*a* receives stress from the inner circumferential surface of the bus bar holder insertion portion 21*a* through the front side O-ring 71.

The main body portion 61*a* receives stress from the inner circumferential surface of the bus bar holder insertion portion 21*a* through the front side O-ring 71, such that the main body portion 61*a* is pressed against the stator 40 and the radial position of the main body portion 61*a* positioned by the stator 40, as described above, is fixed. In this way, the radial position of the bus bar portion 60 with respect to the front housing portion 21 is fixed.

Further, the large-diameter portion step surface 63*f* contacts an outer edge portion of the stator 40, such that the position in the axial direction (the Z-axis direction) of the bus bar portion 60 with respect to the front housing portion 21 is determined. That is, the main body portion 61*a* is axially positioned with respect to the stator 40.

Next, the bus bar portion 60 is preferably covered with the rear housing portion 22 from the rear side (the +Z side) and the housing accommodation outer peripheral portion 62*a* of the outer shell portion 62 in the main body portion 61*a* is press-fitted into the bus bar holder press-fitting portion 22*a*. The press-fitting is preferably performed until the front side flange portion 28 and the rear side flange portion 29 contact each other. At this time, the surface on the front side (the −Z side) of the lid portion 22*b* of the rear housing portion 22 contacts the whole circumference of the rear side O-ring 72. In this way, the bus bar portion 60 is press-fitted and fixed to the rear housing portion 22.

Next, the front housing portion 21 and the rear housing portion 22 are joined to each other. A method of joining the front housing portion 21 and the rear housing portion 22 is not particularly limited, and in this preferred embodiment, for example, a method of performing caulking without using rivets is preferably selected.

Specifically, in a state where the through-holes 28*a*, 28*b*, and 28*c* which are located at the front side flange portion 28 and the through-holes 29*a*, 29*b*, and 29*c* which are located at the rear side flange portion 29 are respectively aligned to each other, the front side flange portion 28 and the rear side flange portion 29 are superimposed on each other. In this state, a die is disposed on the rear side flange portion 29 side (the +Z side) and a punch is driven from the front side flange portion 28 side (the −Z side). In this way, stamped portions 28*d*, 28*e*, and 28*f* of the front side flange portion 28 and stamped portions 29*d*, 29*e*, and 29*f* of the rear side flange portion 29 are pushed into the die, thus protruding to the rear side (the +Z side), and thus the front housing portion 21 and the rear housing portion 22 are joined to each other.

In this way, the relative positions of the front housing portion 21 and the rear housing portion 22 are fixed and the bus bar portion 60 is fixed with respect to the housing 20.

Next, the oil seal 80 is preferably installed around the shaft 31 from the output shaft hole 27.

The motor 10 is preferably assembled through the above steps.

According to this preferred embodiment, the main body portion 61*a* of the bus bar holder 61 is positioned by the stator 40 in the axial direction and the radial direction of the shaft 31. For this reason, it is not necessary to provide a step of positioning the bus bar holder 61, in the housing 20, and thus an increase in the size of the housing 20 is prevented. Therefore, according to this preferred embodiment, the motor 10 is obtained which has a structure in which it is possible to position the bus bar holder 61 while preventing an increase in size.

Further, in a case where the bus bar holder 61 is positioned by the housing 20, the position of the bus bar holder with respect to the stator 40 is determined through the housing 20. For this reason, design errors are accumulated by an amount corresponding to the positioning through the housing 20, and thus there is a concern that the relative positional accuracy between the stator 40 and the bus bar holder 61 may be lowered.

In contrast, according to this preferred embodiment, the main body portion 61*a* of the bus bar holder 61 is directly positioned by the stator 40, and therefore, the relative positional accuracy between the bus bar holder 61 and the stator 40 is prevented from being lowered.

Further, according to this preferred embodiment, the bus bar holder 61 is positioned with respect to the stator 40 having relatively high rigidity, and therefore, the bus bar holder 61 and the stator 40 is accurately positioned.

Further, according to this preferred embodiment, the large-diameter portion step surface 63*f* of the large-diameter stepped portion 68 contacts the core back end surface 41*c* of the core back portion 41 in the stator core 45, such that the main body portion 61*a* is positioned in the axial direction. Further, the large-diameter portion side surface 63*e* of the large-diameter stepped portion 68 preferably contacts the core back outer side surface 41*a* of the core back portion 41 in the stator core 45 or faces the core back outer side surface 41*a* with the first gap interposed therebetween, such that the main body portion 61*a* is positioned in the radial direction. Therefore, according to this preferred embodiment, two surfaces contact each other or face each other, such that the position of the main body portion 61*a* is determined, and therefore, it is possible to accurately position the main body portion 61*a*.

Further, according to this preferred embodiment, the large-diameter portion side surface 63*e* contacts the core back outer side surface 41*a* of the core back portion 41 or faces the core back outer side surface 41*a* with the first gap interposed therebetween, and therefore, the main body portion 61*a* of the bus bar holder 61 is positioned in the radial direction at an end portion on the outside in the radial direction of the stator 40. In this way, a portion of the main body portion 61*a* is never disposed on the inside in the radial direction of the stator 40 in order to position the main body portion 61*a*. Therefore, according to this preferred embodiment, it is not necessary to change the structure on the inside in the radial direction of the stator 40, that is, a design of the teeth portion 42, the coil portion 43, the bobbin 44, or the like, with respect to the structure of a stator of the related art in order to position the main body portion 61*a* of the bus bar holder 61.

Further, according to this preferred embodiment, the radial dimension of the first gap which is interposed between the large-diameter portion side surface 63*e* and the core back outer side surface 41*a* of the core back portion 41 is preferably smaller than the dimension W3 in the radial direction of the second gap 83 between the teeth portion 42 and the rotor 30. For this reason, even if the main body portion 61*a* of the bus bar holder 61 moves slightly in the radial direction due to the interposition of the first gap and the rotor 30 moves slightly in the radial direction through the rear bearing 52 according to the movement, the rotor 30 and the teeth portion 42 of the stator 40 never contact each other.

Further, according to this preferred embodiment, the large-diameter portion step surface 63*f* which is used for the axial positioning of the main body portion 61*a* is a flat surface, and the large-diameter portion side surface 63*e* which is used for the radial positioning of the main body portion 61*a* is a surface along the core back outer side surface 41*a* of the core back portion 41. For this reason, the contact area between the large-diameter portion step surface 63*f* and the core back end surface 41*c* and the contact area between the large-diameter portion side surface 63*e* and the core back outer side surface 41*a* is increased. In this way, according to this preferred embodiment, the contact surface between the main body portion 61*a* and the core back portion 41 of the stator 40 is easily defined, and thus it is possible to more accurately position the main body portion 61*a*.

Further, for example, in a case where the stator core 45 is configured by rotational lamination, there is a case where a bias occurs in the radial position with respect to the shaft 31, of the stator core 45 which is laminated, and the bias varies for each layer in the circumferential direction. In such a case, there is a case where the position of the main body portion 61*a* of the bus bar holder 61 which is positioned in the radial direction by the stator core 45 is shifted with respect to the shaft 31 according to the bias of a layer of the stator core 45 which contacts or faces the large-diameter portion side surface 63*e*.

In contrast, according to this preferred embodiment, the axial dimension of the large-diameter portion side surface 63*e* of the main body portion 61*a* is larger than the radial dimension of the large-diameter portion step surface 63*f* of the main body portion 61*a*. For this reason, it is possible to increase the number of layers of the stator core 45 which contact or face the large-diameter portion side surface 63*e*. Therefore, according to this preferred embodiment, the radial position of the main body portion 61*a* is determined by the bias of the plurality of layers of the stator core 45, and therefore, bias in one direction is suppressed, and as a result, the radial position of the main body portion 61*a* is prevented from being shifted with respect to the shaft 31.

Further, according to this preferred embodiment, the diameter of the large-diameter stepped portion 68, that is, the inner diameter of the O-ring retaining portion main body 63 at the position of the large-diameter portion side surface 63*e*, preferably gradually increases toward the front side (the −Z side). For this reason, in a case of manufacturing the bus bar holder 61 by, for example, injection molding, it is easy to extract a mold used in molding the front side of the main body portion 61*a* from the inside of the main body portion 61*a*. In this way, when extracting the mold at the time of manufacturing of the bus bar holder 61, the large-diameter stepped portion 68 of the main body portion 61*a* is prevented from being distorted.

Further, according to this preferred embodiment, the housing 20 includes the front housing portion 21 and the rear housing portion 22. For this reason, at the time of assembling of the motor 10, after the stator 40 is fixed to the front housing portion 21, the main body portion 61*a* of the bus bar holder 61 is positioned with respect to the stator 40 which is exposed through the front side opening portion 24 of the front housing portion 21.

Therefore, according to this preferred embodiment, at the time of assembling of the motor 10, it is easy to perform the positioning of the main body portion 61*a* of the bus bar holder 61 with respect to the stator 40.

Further, according to this preferred embodiment, the bus bar holder 61 is preferably covered with the rear housing portion 22 from the rear side after the bus bar holder 61 is positioned, such that the bus bar holder 61 is accommodated in the housing 20, and therefore, the protection performance of the bus bar holder 61 is improved.

Further, at the time of assembling of the motor 10 according to this preferred embodiment, the front side flange portion 28 and the rear side flange portion 29 contact each other, such that the rear housing portion 22 is axially positioned with respect to the front housing portion 21. At this time, in a case where the lid portion 22b of the rear housing portion 22 contacts the main body portion 61a before the front side flange portion 28 and the rear side flange portion 29 contact each other, the rear housing portion 22 and the front housing portion 21 cannot be joined to each other and the bus bar holder 61 cannot be accommodated in the housing 20.

In contrast, according to this preferred embodiment, the third gap 81 is provided between the main body portion 61a and the lid portion 22b, and therefore, at the time of assembling of the motor 10, the lid portion 22b is prevented from coming into contact with the main body portion 61a before the front side flange portion 28 and the rear side flange portion 29 contact each other, and thus the main body portion 61a is positioned.

Further, in a case where the coefficient of thermal expansion of the bus bar holder 61 made of resin is greater than the coefficient of thermal expansion of the housing 20 made of metal, the amount of deformation due to thermal expansion of the bus bar holder 61 is greater than the amount of deformation due to thermal expansion of the housing 20. For this reason, the bus bar holder 61 greatly expands with respect to the housing 20, such that there is a concern that the bus bar holder 61 may be damaged.

In contrast, according to this preferred embodiment, the third gap 81 is provided between the main body portion 61a and the lid portion 22b, and therefore, a difference between the amount of deformation due to thermal expansion of the bus bar holder 61 and the amount of deformation due to thermal expansion of the housing 20 is absorbed by the third gap 81. Therefore, according to this preferred embodiment, the bus bar holder 61 is prevented from being damaged due to thermal expansion.

Further, according to this preferred embodiment, the protrusion portions 65a to 65c which contact the rear housing portion 22 are preferably provided in the main body portion 61a of the bus bar holder 61, and therefore, the bus bar holder 61 is stably fixed to the rear housing portion 22.

Further, at the time of assembling of the motor 10 according to this preferred embodiment, when the bus bar portion 60 is inserted into the front housing portion 21 from the front side opening portion 24, in a case where the connector connection portion 62b contacts the front side flange portion 28 of the front housing portion 21 before the large-diameter portion step surface 63f of the main body portion 61a contacts the core back end surface 41c of the core back portion 41 in the stator core 45, it is not possible to position the main body portion 61a by the stator 40.

In contrast, according to this preferred embodiment, the fourth gap 82 is provided at the end portion on the rear side of the bus bar holder insertion portion 21a, that is, between the front side flange portion 28 and the connector connection portion 62b. For this reason, the connector connection portion 62b is prevented from coming into contact with the front side flange portion 28 of the front housing portion 21 before the large-diameter portion step surface 63f of the main body portion 61a contacts the core back end surface 41c of the core back portion 41. Therefore, according to this preferred embodiment, it is possible to position the main body portion 61a by the stator 40.

Further, according to this preferred embodiment, the fourth gap 82 is provided between the front side flange portion 28 and the connector connection portion 62b, and therefore, the bus bar holder 61 is prevented from being damaged due to thermal expansion, as described above.

Further, according to this preferred embodiment, O-rings, that is, the front side O-ring 71 and the rear side O-ring 72, are respectively provided between the front housing portion 21 and the bus bar holder 61 and between the rear housing portion 22 and the bus bar holder 61. Therefore, according to this preferred embodiment, water, oil, or the like are prevented from reaching the rotor 30 or the stator 40 from the gap between the housing 20 and the bus bar holder 61.

Further, according to this preferred embodiment, the front side O-ring 71 is provided at the small-diameter stepped portion 69, and therefore, the main body portion 61a receives stress from the inner circumferential surface of the bus bar holder insertion portion 21a through the front side O-ring 71. For this reason, according to this preferred embodiment, the main body portion 61a is pressed against the stator 40, and thus the radial position of the main body portion 61a is fixed.

Further, according to this preferred embodiment, a portion on the front side of the front side O-ring 71 is disposed in a range in which the stator 40 and the main body portion 61a overlap each other in the axial direction. In this way, when the main body portion 61a receives stress from the inner circumferential surface of the bus bar holder insertion portion 21a through the front side O-ring 71, a force in which the main body portion 61a is pressed against the stator 40 is increased. Therefore, according to this preferred embodiment, the main body portion 61a of the bus bar holder 61 is more stably fixed to the stator 40.

Further, according to this preferred embodiment, the small-diameter stepped portion 69 is provided in the O-ring retaining portion 62c. For this reason, due to the small-diameter portion step surface 63d of the small-diameter stepped portion 69, when the bus bar holder 61 is inserted into the front housing portion 21, the front side O-ring 71 is prevented from being shifted to the rear side (the +Z side), and thus coming off.

Further, according to this preferred embodiment, the O-ring retaining portion 62c includes the convex portions 63a, 63b, and 63c. For this reason, due to the convex portions 63a, 63b, and 63c, when the bus bar holder 61 is inserted into the front housing portion 21, the front side O-ring 71 is prevented from being shifted to the front side (the −Z side), and thus coming off.

Further, according to this preferred embodiment, each of the front side groove portions of an O-ring 73a, 73b, and 73c is defined by each of the convex portions 63a, 63b, and 63c and the small-diameter portion step surface 63d, and therefore, the front side O-ring 71 is stably retained.

Further, according to this preferred embodiment, the convex portions 63a, 63b, and 63c are disposed at equal or substantially equal intervals in the circumferential direction of the small-diameter portion side surface 63g, and therefore, the front side groove portions of an O-ring 73a, 73b, and 73c are provided at equal or substantially equal intervals in the circumferential direction of the small-diameter portion side surface 63g. Therefore, according to this preferred embodiment, the front side O-ring 71 is more stably retained.

In addition, in this preferred embodiment, it is also possible to adopt the following configurations.

In this preferred embodiment, the large-diameter portion step surface 63f may not be a flat surface and may not be perpendicular to the axial direction.

Further, in this preferred embodiment, the large-diameter portion side surface 63e may not follow the side surface of the stator 40, that is, in this preferred embodiment, the core back outer side surface 41a and may be parallel or substantially parallel to the axial direction.

Further, in this preferred embodiment, the axial dimension of the large-diameter portion side surface 63e may be smaller than the radial dimension of the large-diameter portion step surface 63f.

Further, in this preferred embodiment, the axial dimension of the large-diameter portion side surface 63e and the radial dimension of the large-diameter portion step surface 63f may be the same.

Further, in this preferred embodiment, the small-diameter portion step surface 63d may not be perpendicular to the axial direction.

Further, in this preferred embodiment, the small-diameter portion side surface 63g may not be parallel to the axial direction.

Further, in this preferred embodiment, the third gap 81 may not be provided between the outer shell portion 62 and the lid portion 22b.

Further, in this preferred embodiment, the fourth gap 82 may not be provided between the end portion on the rear side (the +Z side) of the bus bar holder insertion portion 21a and the connector connection portion 62b.

In this preferred embodiment, the protrusion portions 65a to 65c may not be provided. In this case, for example, a configuration as shown in FIG. 14 is also acceptable.

Figure 14:
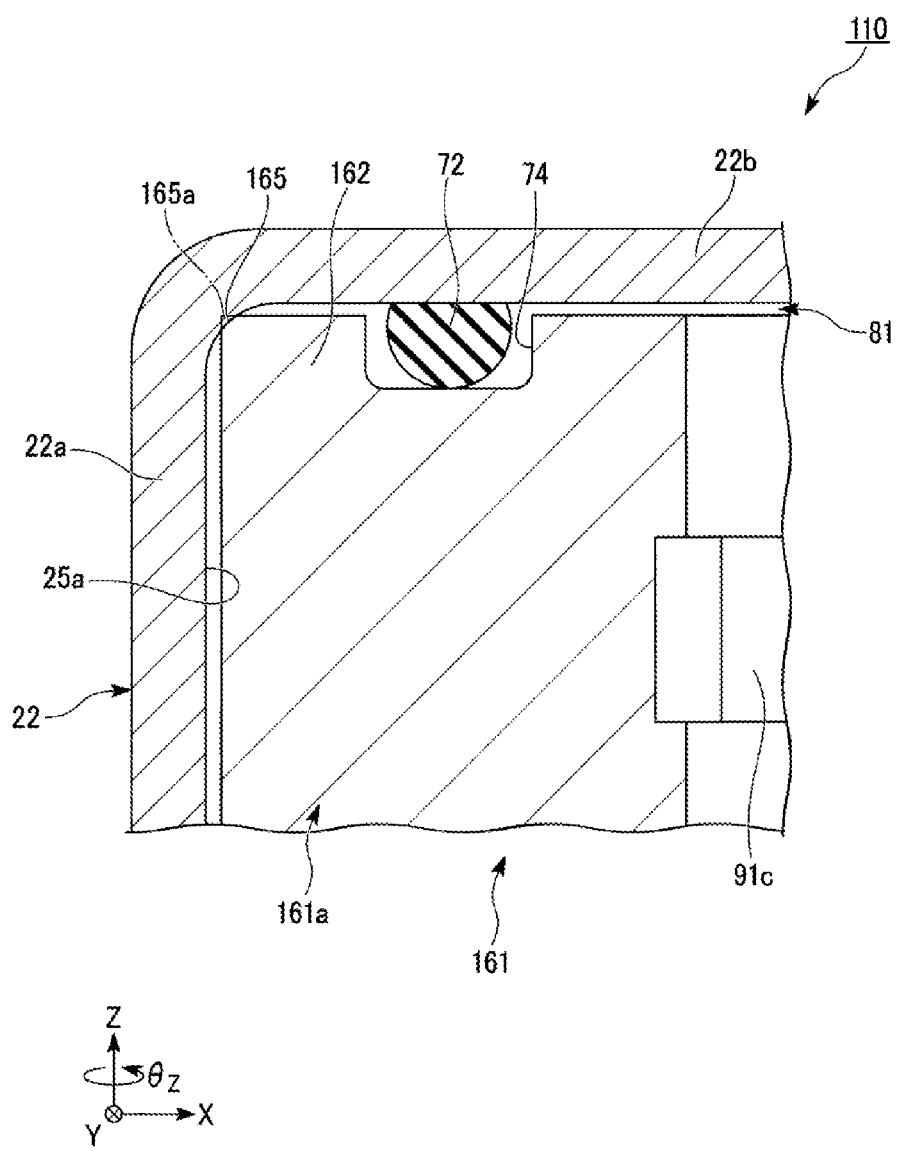
FIG. 14 is a partially enlarged cross-sectional view showing another example of the motor according to the first preferred embodiment of the present invention.

FIG. 14 is a partially enlarged cross-sectional view showing a motor 110 which is another example of this preferred embodiment. The cross-section shown in FIG. 14 preferably is the same or substantially the same as the cross-section shown in FIG. 1 or the like.

In addition, in the following description, the same configuration as the configuration described above is appropriately denoted by the same reference numerals, and thus there is a case where description is omitted.

The motor 110 includes a bus bar holder 161, as shown in FIG. 14.

A main body portion 161a of the bus bar holder 161 includes an outer shell portion 162. In this configuration, unlike the outer shell portion 62 described above, a protrusion portion is not provided on the outer circumferential surface of the outer shell portion 162.

An outer edge in an end portion on the rear side (the +Z side) of the outer shell portion 162 is in contact with the rear housing portion 22. That is, a contact portion 165 which contacts the rear housing portion 22 is preferably provided in the outer edge in the end portion on the rear side (the +Z side) of the outer shell portion 162. In other words, the contact portion 165 which contacts the rear housing portion 22 is provided in the main body portion 161a, and the contact portion 165 is provided in an outer edge in an end portion on the rear side of the bus bar holder 161.

In this configuration, in a state where the bus bar holder 161 is not inserted into the rear housing portion 22, an outer edge 165a in the end portion on the rear side of the outer shell portion 162 is provided so as to be located farther to the outside than the inner circumferential surface of the rear housing portion 22. For this reason, at the time of assembling of the motor 110, if the bus bar holder 161 is inserted into the rear housing portion 22, the outer edge 165a contacts the inner circumferential surface of the rear housing portion 22, thereby being crushed. In this way, the contact portion 165 which contacts the rear housing portion 22 is provided in the outer edge in the end portion on the rear side of the outer shell portion 162.

According to this configuration, similar to the preferred embodiment described above, the bus bar holder 161 is stably fixed to the rear housing portion 22.

Figure 15:
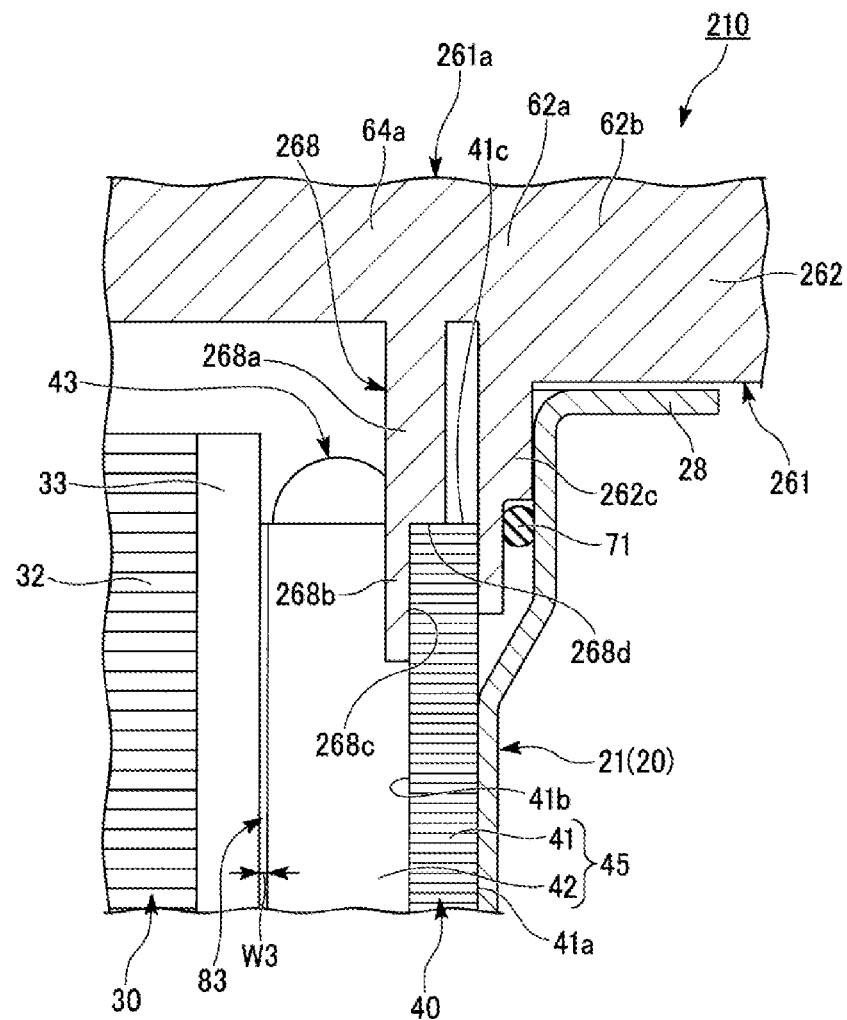
FIG. 15 is a partially enlarged cross-sectional view showing another example of the motor according to the first preferred embodiment of the present invention.

Further, in the above description, a configuration has been described in which the main body portion 61a is radially positioned with respect to the core back outer side surface 41a of the core back portion 41 in the stator core 45. However, it is not limited thereto. In a preferred embodiment of the present invention, as shown in FIG. 15, a configuration may be made in which a main body portion 261a is radially positioned with respect to the core back inner side surface (the inner side surface) 41b of the core back portion 41 in the stator core 45. That is, in this preferred embodiment, the side surface of the stator core 45 which radially positions the main body portion can adopt a configuration in which it is the core back outer side surface 41a or the core back inner side surface 41b of the core back portion 41.

FIG. 15 is a partially enlarged cross-sectional view showing a motor 210 which is another example of this preferred embodiment. The cross-section shown in FIG. 15 is a cross-section at a position avoiding the teeth portion 42, unlike FIG. 1, 11, or the like. That is, FIG. 15 is a cross-sectional view showing a state of being slightly rotated around the axis (in the $\theta_z$ direction) with respect to FIG. 1, 11, or the like.

In addition, in the following description, the same configuration as the configuration described above is appropriately denoted by the same reference numerals, and thus there is a case where description is omitted.

The motor 210 preferably includes a bus bar holder 261 having the main body portion 261a, as shown in FIG. 15.

The main body portion 261a of the bus bar holder 261 includes an outer shell portion 262 and the connection portion 64a.

The outer shell portion 262 preferably includes the housing accommodation outer peripheral portion 62a, an O-ring retaining portion 262c, and a positioning portion 268.

The O-ring retaining portion 262c preferably includes a configuration which is the same as the O-ring retaining portion 62c described above, except that a large-diameter stepped portion is not provided on the inside thereof.

The positioning portion 268 is provided farther to the inside in the radial direction than the O-ring retaining portion 262c. The positioning portion 268 protrudes from the surface on the front side (the −Z side) of the connection portion 64a. Although illustration is omitted, a plurality of the positioning portions 268 is preferably provided to correspond to the gaps between the teeth portions 42 adjacent to each other. The positioning portion 268 preferably includes a base portion 268a including a positioning end surface (the first end surface) 268d, and a tip protrusion portion 268b including a positioning side surface (the first side surface) 268c.

The base portion 268a is preferably connected to the surface on the front side (the −Z side) of the connection portion 64a. The positioning end surface 268d is the end surface on the front side (the −Z side) of the base portion 268a. The positioning end surface 268d is a flat surface extending radially outward from the positioning side surface 268c. The positioning end surface 268d is preferably in contact with the core back end surface 41c on the rear side (the +Z side) of the core back portion 41 of the stator core 45.

The tip protrusion portion 268b is configured to protrude from an end portion on the inside in the radial direction of the positioning end surface 268d of the base portion 268a to the front side (the −Z side). The tip protrusion portion 268b is located in the gap between the teeth portions 42 adjacent to each other.

The positioning side surface 268c is the side surface on the outside in the radial direction of the tip protrusion portion 268b. The positioning side surface 268c is connected to the positioning end surface 268d and extends from the positioning end surface 268d to the front side (the −Z side) in the axial direction (the Z-axis direction). The positioning side surface 268c is located on the inside in the radial direction of the positioning end surface 268d, unlike the relationship between the large-diameter portion step surface 63f and the large-diameter portion side surface 63e described above.

That is, in this preferred embodiment, the first side surface which radially positions the main body portion preferably adopts a configuration in which it is located on the outside in the radial direction of the large-diameter portion side surface 63f which is the first end surface, like the large-diameter portion step surface 63e, or on the inside in the radial direction of the positioning end surface 268d which is the first end surface, like the positioning side surface 268c.

The positioning side surface 268c contacts the core back inner side surface 41b on the inside in the radial direction of the core back portion 41 or faces the core back inner side surface 41b with the first gap interposed therebetween. In other words, the positioning side surface 268c contacts the side surface of the stator core 45 or faces the side surface of the stator core 45 with the first gap interposed therebetween, and the side surface of the stator core 45 is the core back inner side surface 41b of the core back portion 41.

The positioning end surface 268d and the positioning side surface 268c preferably adopt the same configurations as the large-diameter portion step surface 63f and the large-diameter portion side surface 63e described above, with respect to configurations other than those described above.

The positioning end surfaces 268d of the plurality of positioning portions 268 contact the core back end surface 41c of the stator core 45, such that the position in the axial direction (the Z-axis direction) of the main body portion 261a is determined. The positioning side surfaces 268c of the plurality of positioning portions 268 contact the core back inner side surface 41b of the core back portion 41 or face the core back inner side surface 41b with the first gap interposed therebetween, such that the radial position of the main body portion 261a is determined.

In this manner, according to this configuration, similar to the above description, the main body portion 261a is preferably positioned by the stator 40 in the axial direction (the Z-axis direction) and the radial direction of the shaft 31. For this reason, according to this configuration, an increase in the size of the housing 20 is prevented.

In addition, in this configuration, the positioning side surface 268c and the positioning end surface 268d may not be connected. The positioning side surface 268c and the positioning end surface 268d not being connected is, for example, a case such as a positioning portion including a positioning side surface as the first side surface and a positioning portion including a positioning end surface as the first end surface being separately provided in an end portion on the front side of the housing accommodation outer peripheral portion 62a.

Further, in this configuration, the positioning portion 268 may not include the tip protrusion portion 268b. In this case, a configuration preferably is provided in which the inner side surface of the O-ring retaining portion 262c contacts the core back outer side surface 41a of the core back portion 41 of the stator core 45 or faces the core back outer side surface 41a with the first gap interposed therebetween. That is, in this case, the positioning end surface 268d of the base portion 268a of the positioning portion 268 contacts the core back end surface 41c of the core back portion 41, such that the main body portion 261a is positioned in the axial direction. Then, the inner side surface of the O-ring retaining portion 262c contacts the core back outer side surface 41a of the core back portion 41 of the stator core 45 or faces the core back outer side surface 41a with the first gap interposed therebetween, such that the main body portion 261a is positioned in the radial direction.

Further, in a case where the radial positioning of the main body portion 261a is performed by a plurality of protrusion portions, like the positioning portion 268 of this configuration, the positioning side surface 268c may be a flat surface.

Further, in this preferred embodiment, a configuration has been described in which, like the convex portions 63a to 63c, a plurality of convex portions are provided on the small-diameter portion side surface 63g. However, it is not limited thereto. In this preferred embodiment, a single convex portion preferably is provided on the small-diameter portion side surface 63g.

Further, in this preferred embodiment, a configuration is also acceptable in which the whole of the front side O-ring 71 is disposed in a range in which the stator 40 and the main body portion 61a overlap each other in the axial direction. That is, in this preferred embodiment, a configuration preferably is adopted in which at least a portion on the front side of the front side O-ring 71 is disposed in a range in which the stator 40 and the main body portion 61a overlap each other in the axial direction.

Further, in the above description, a configuration has been described in which the housing accommodation outer peripheral portion 62a of the main body portion 61a in the bus bar holder 61 is press-fitted into only the rear housing portion 22. However, it is not limited thereto. In this preferred embodiment, for example, a configuration is also acceptable in which the housing accommodation outer peripheral portion 62a is press-fitted into both the front housing portion 21 and the rear housing portion 22, and a configuration is also acceptable in which the housing accommodation outer peripheral portion 62a is press-fitted into only the front housing portion 21.

Further, in the above description, the opening portion of a connector 26 has been described as being configured with the front housing portion 21 and the rear housing portion 22. However, it is not limited thereto. In this preferred embodiment, the opening portion of a connector 26 may have, for example, a configuration in which it is provided in the surface on the rear side (the +Z side) of the lid portion 22b of the rear housing portion 22.

Further, in this preferred embodiment, the rear housing portion 22 may not be provided.

Further, in this preferred embodiment, the front housing portion 21 and the rear housing portion 22 may be an integrated member.

Further, in the above description, a configuration has been described in which the front side O-ring 71 is provided inside the front housing portion 21 and the rear side O-ring 72 is provided inside the rear housing portion 22. However, it is not limited thereto. In this preferred embodiment, a configuration is also acceptable in which an O-ring is provided inside at least one of the front housing portion 21 and the rear housing portion 22. That is, in this preferred embodiment, a configuration is also acceptable in which either of the front side O-ring 71 and the rear side O-ring 72 is not provided.

Further, in this preferred embodiment, for example, in a case where the motor 10 includes only the front side O-ring 71 out of the front side O-ring 71 and the rear side O-ring 72, all the O-rings which the motor 10 of this preferred embodiment includes, that is, only the front side O-ring 71, are retained in the small-diameter stepped portion 69 of the O-ring retaining portion 62c. That is, in this preferred embodiment, a configuration preferably is adopted in which at least a portion of the O-ring which the motor 10 has is retained in the small-diameter stepped portion 69.

Further, in this preferred embodiment, both the front side O-ring 71 and the rear side O-ring 72 may not be provided.

Further, in this preferred embodiment, a configuration is also acceptable in which an O-ring is provided at a joint surface where the front side flange portion 28 and the rear side flange portion 29 are joined together.

Further, in this preferred embodiment, the oil seal 80 may not be provided.

A second preferred embodiment is different from the first preferred embodiment in that a main body portion is positioned by a teeth portion of a stator core.

In addition, in the following description, the same configuration as that of the above-described preferred embodiment is appropriately denoted by the same reference numeral, and thus there is a case where description is omitted.

Figure 16:
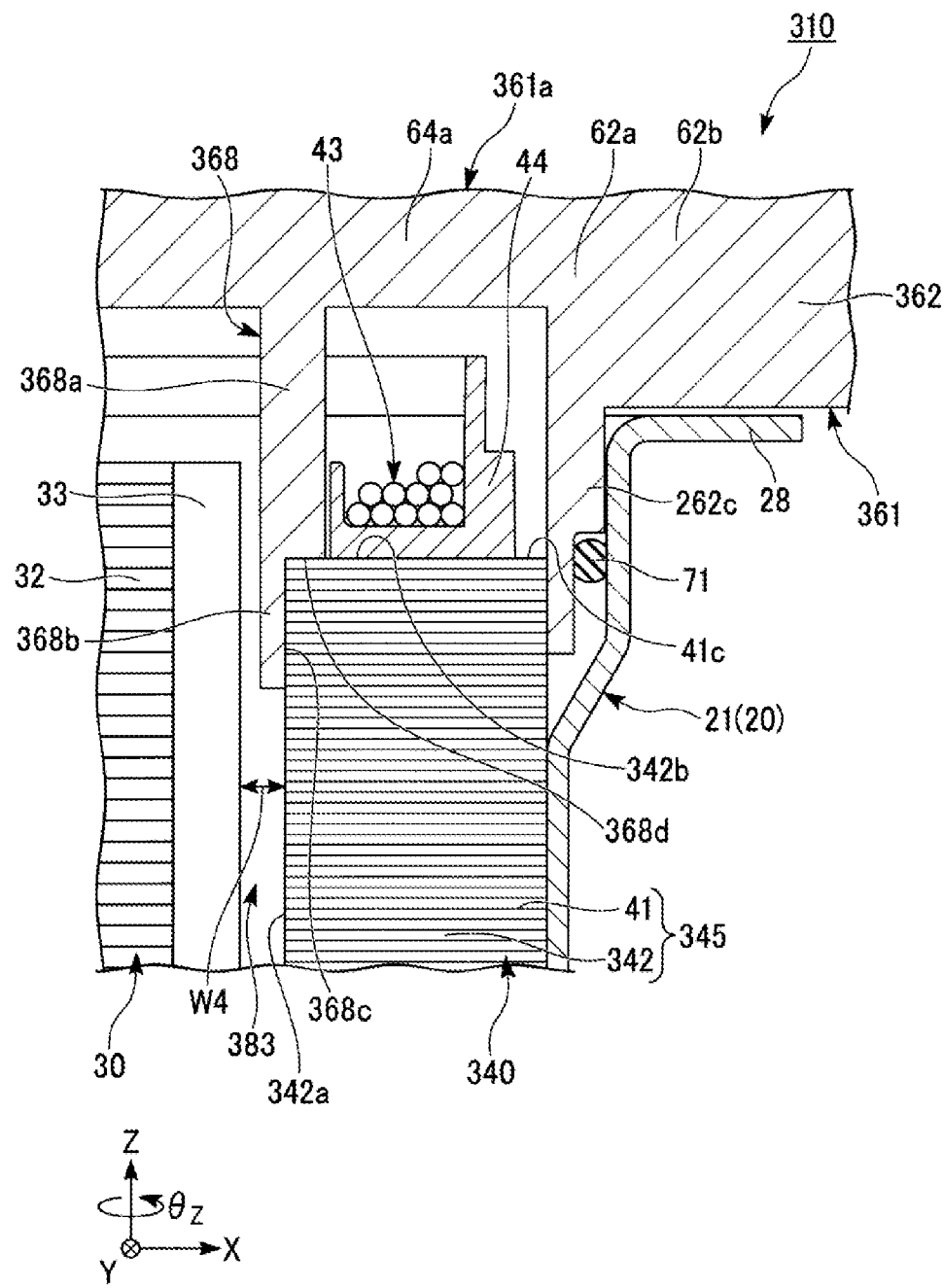
FIG. 16 is a partially enlarged cross-sectional view showing a motor according to a second preferred embodiment of the present invention.

FIG. 16 is a cross-sectional view showing a motor 310 according to this preferred embodiment. The cross-section shown in FIG. 16 is a cross-section passing through a teeth portion 342 of a stator 340, similar to the cross-section shown in FIG. 1.

The motor 310 according to this preferred embodiment preferably includes the stator 340 and a bus bar holder 361 having a main body portion 361a, as shown in FIG. 16.

The stator 340 has a configuration which is the same as that of the stator 40 of the first preferred embodiment except that the teeth portion 342 is provided to protrude further to the inside in the radial direction than the bobbin 44.

The main body portion 361a of the bus bar holder 361 includes an outer shell portion 362 and the connection portion 64a.

The outer shell portion 362 preferably includes the housing accommodation outer peripheral portion 62a, the O-ring retaining portion 262c, and a positioning portion 368.

The positioning portion 368 is provided farther to the inside in the radial direction than the bobbin 44. The positioning portion 368 protrudes from the surface on the front side (the −Z side) of the connection portion 64a. The positioning portion 368 may have a tubular shape and may be provided in a plurality, one corresponding to each teeth portion 342. The positioning portion 368 preferably includes a base portion 368a including a positioning end surface (the first end surface) 368d, and a tip protrusion portion 368b including a positioning side surface (the first side surface) 368c.

The base portion 368a is connected to the surface on the front side (the −Z side) of the connection portion 64a. The positioning end surface 368d is the end surface on the front side of the base portion 368a. The positioning end surface 368d is preferably a flat surface extending radially outward from the positioning side surface 368c. The positioning end surface 368d is in contact with a teeth end surface (an end surface) 342b on the rear side (the +Z side) of the teeth portion 342 of a stator core 345.

The tip protrusion portion 368b is configured to protrude from an end portion on the inside in the radial direction of the positioning end surface 368d of the base portion 368a to the front side (the −Z side). The tip protrusion portion 368b is located in a second gap 383 between the teeth portion 342 and the rotor 30. The positioning side surface 368c is the side surface on the outside in the radial direction of the tip protrusion portion 368b.

The positioning side surface 368c is connected to the positioning end surface 368d and extends from the positioning end surface 368d to the front side (the −Z side). The positioning side surface 368c is located on the inside in the radial direction of the positioning end surface 368d. The positioning side surface 368c contacts a teeth inner side surface (an inner side surface) 342a on the inside in the radial direction of the teeth portion 342 or faces the teeth inner side surface 342a with the first gap interposed therebetween. In other words, the positioning side surface 368c contacts the side surface of the stator core 345 or faces the side surface of the stator core 345 with the first gap interposed therebetween, and the side surface of the stator core 345 is the teeth inner side surface 342a of the teeth portion 342.

The radial dimension of the first gap which is interposed between the positioning side surface 368c and the stator core 345 is smaller than a dimension W4 in the radial direction of the second gap 383 between the teeth portion 342 and the rotor 30, similar to the first preferred embodiment. In this preferred embodiment, the dimension W4 is preferably larger than the radial dimension of the tip protrusion portion 368b which is provided between the teeth portion 342 and the rotor 30.

The positioning end surface 368d and the positioning side surface 368c preferably adopts the same configurations as the large-diameter portion step surface 63f and the large-diameter portion side surface 63e of the first preferred embodiment, with respect to configurations other than those described above.

The positioning portion 368 is positioned with respect to each teeth portion 342, such that the position in the axial direction (the Z-axis direction) and the position in the radial direction of the main body portion 361a are determined.

In this manner, according to this preferred embodiment, similar to the first preferred embodiment, the main body portion 361a is positioned by the stator 340 in the axial direction (the Z-axis direction) and the radial direction of the shaft 31, and therefore, an increase in the size of the housing 20 is prevented.

A third preferred embodiment is different from the first preferred embodiment in that a stator core includes a groove portion and a bus bar holder is fitted into the groove portion.

In addition, in the following description, the same configuration as the configurations of the above-described preferred embodiments is appropriately denoted by the same reference numeral, and thus there is a case where description is omitted.

Figure 17:
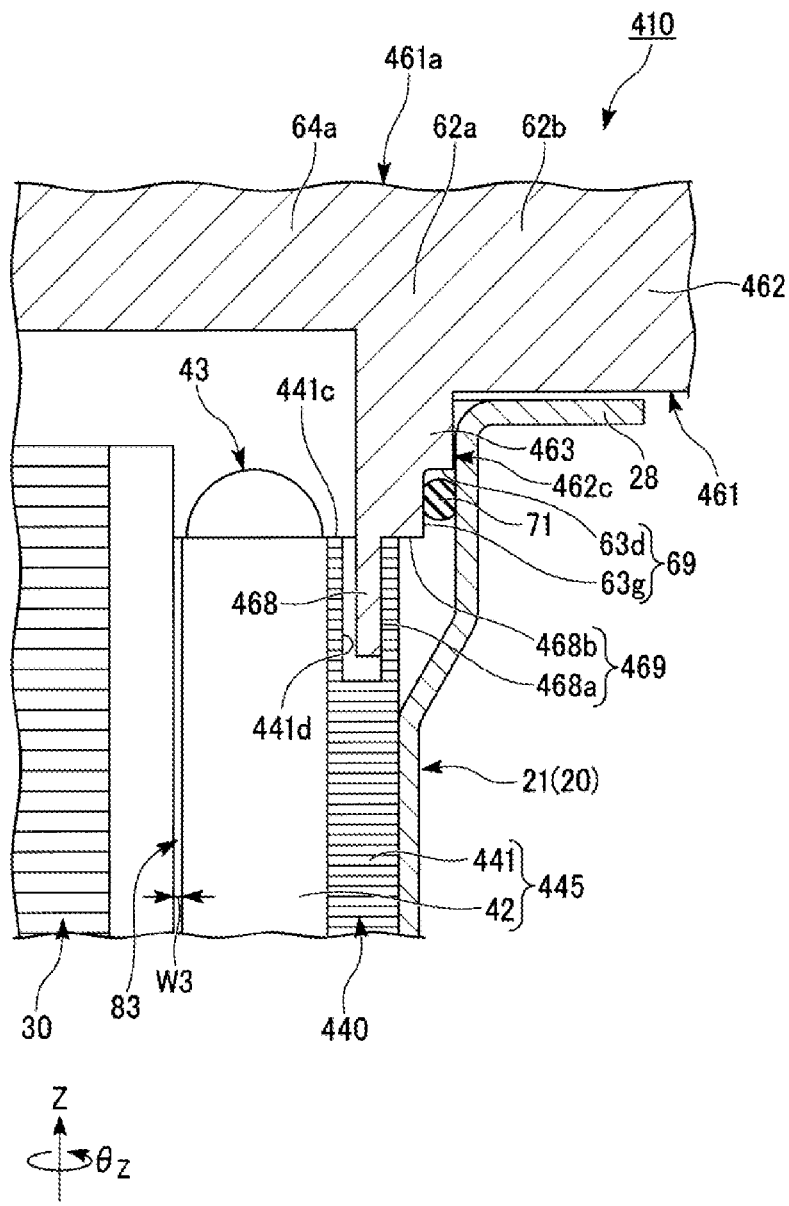
FIG. 17 is a partially enlarged cross-sectional view showing a motor according to a third preferred embodiment of the present invention.

FIG. 17 is a cross-sectional view showing a motor 410 according to this preferred embodiment. The cross-section shown in FIG. 17 is a cross-section at a position avoiding the teeth portion 42, similar to the cross-section shown in FIG. 15.

The motor 410 according to this preferred embodiment has a stator 440, and a bus bar holder 461 including a main body portion 461a, as shown in FIG. 17.

The stator 440 preferably includes a stator core 445 which includes a core back portion 441 and the teeth portion 42, and the coil portion 43.

The core back portion 441 includes a groove portion (a contact portion) 441d which is open in a core back end surface (the end surface) 441c on the rear side (the +Z side) and is recessed to the front side (the −Z side). In other words, the stator core 445 includes the groove portion 441d which is recessed from the core back end surface 441c on the rear side to the front side. The core back portion 441 preferably has a configuration which is the same as that of the core back portion 41 of the first preferred embodiment except that the core back portion 441 includes the groove portion 441d.

The groove portion 441d may be provided in an annular shape in a plan view (an X-Y plane view) and may be provided in a plurality along the circumferential direction in the core back end surface 441c of the core back portion 441.

The main body portion 461a of the bus bar holder 461 preferably includes an outer shell portion 462.

The outer shell portion 462 includes the housing accommodation outer peripheral portion 62a and an O-ring retaining portion 462c.

The O-ring retaining portion 462c is different from the O-ring retaining portion 262c shown in FIG. 15 in the first preferred embodiment in that a second small-diameter stepped portion 469 in which a diameter is further reduced is further provided on the front side (the −Z side) of the small-diameter stepped portion 69.

The O-ring retaining portion 462c preferably includes an O-ring retaining portion main body 463 and a tip protrusion portion 468.

The O-ring retaining portion main body 463 preferably includes a positioning end surface (the first end surface) 468b which is an end surface on the front side (the −Z side). The positioning end surface 468b is in contact with the core back end surface 441c of the core back portion 441.

The tip protrusion portion 468 is provided to protrude to the front side (the −Z side) at an end portion on the inside in the radial direction of the positioning end surface 468b of the O-ring retaining portion main body 463. The tip protrusion portion 468 is accommodated in the groove portion 441d. An end portion on the front side (the −Z side) of the tip protrusion portion 468 is located farther to the rear side (the +Z side) than the bottom surface of the groove portion 441d. For example, in a case where the groove portion 441d is provided in an annular shape in a plan view, the tip protrusion portion 468 is provided in a tubular shape, and in a case where a plurality of the groove portions 441d are provided along the circumferential direction, the tip protrusion portion 468 is preferably provided in a plurality for each groove portion 441d.

The tip protrusion portion 468 preferably includes a positioning side surface (the first side surface) 468a which is a side surface on the outside in the radial direction. The positioning side surface 468a contacts the inner wall surface on the outside in the radial direction, of the inner wall surface of the groove portion 441d, or faces the inner wall surface on the outside in the radial direction with a first gap interposed therebetween. In other words, the positioning side surface 468a contacts the side surface of the stator core 445 or faces the side surface of the stator core 445 with the first gap interposed therebetween, and the side surface of the stator core 445 is the inner wall surface of the groove portion 441d. In this way, the bus bar holder 461 is fitted into the groove portion 441d.

The second small-diameter stepped portion 469 is preferably defined by the positioning end surface 468b of the O-ring retaining portion main body 463 and the positioning side surface 468a of the tip protrusion portion 468. The positioning end surface 468b and the positioning side surface 468a preferably adopts the same configurations as the positioning end surface 368d and the positioning side surface 368c in the second preferred embodiment, with respect to configurations other than those described above.

According to this preferred embodiment, similar to the first preferred embodiment, the main body portion 461a is preferably positioned by the stator 440 in the axial direction (the Z-axis direction) and the radial direction of the shaft 31, and therefore, an increase in the size of the housing 20 is prevented.

In addition, in this preferred embodiment, the following configurations preferably is adopted.

In this preferred embodiment, the positioning side surface 468a of the tip protrusion portion 468 preferably is a side surface on the inside in the radial direction. In this case, the positioning side surface 468a preferably contacts the inner wall surface on the inside in the radial direction, of the inner wall surface of the groove portion 441d, or faces the inner wall surface on the inside in the radial direction with the first gap interposed therebetween.

Further, in the above description, a configuration has been described in which the tip protrusion portion 468 is included in the O-ring retaining portion 462c. However, it is not limited thereto. In this preferred embodiment, for example, a configuration is also acceptable in which the same positioning portion as the positioning portion 268 shown in the second preferred embodiment is provided separately from the O-ring retaining portion 462c. In this case, a tip protrusion portion of the positioning portion is preferably accommodated in the groove portion.

Further, in this preferred embodiment, a configuration is also acceptable in which the stator core 445 includes a concave portion such as a hole portion, instead of the groove portion 441d.

A fourth preferred embodiment is different from the first preferred embodiment in that a main body portion is positioned by a bobbin of a stator.

In addition, in the following description, the same configuration as the configurations in the above-described preferred embodiments is appropriately denoted by the same reference numeral, and thus there is a case where description is omitted.

Figure 18:
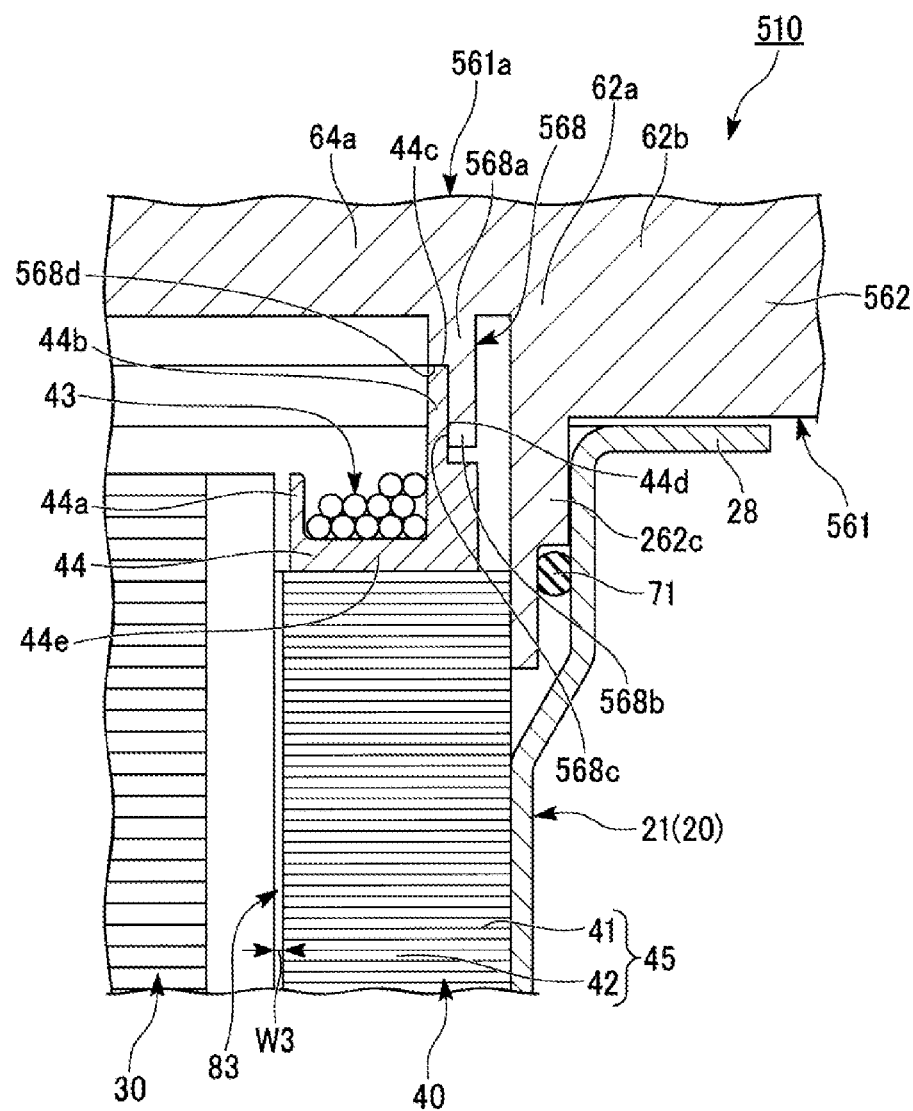
FIG. 18 is a partially enlarged cross-sectional view showing a motor according to a fourth preferred embodiment of the present invention.

FIG. 18 is a cross-sectional view showing a motor 510 according to this preferred embodiment. The cross-section shown in FIG. 18 is a cross-section passing through the teeth portion 42 of the stator 40, similar to the cross-section shown in FIG. 1.

The motor 510 according to this preferred embodiment includes a bus bar holder 561 including a main body portion 561a, as shown in FIG. 18.

The main body portion 561a of the bus bar holder 561 preferably includes an outer shell portion 562 and the connection portion 64a.

The outer shell portion 562 preferably includes the housing accommodation outer peripheral portion 62a, the O-ring retaining portion 262c, and a positioning portion 568.

The positioning portion 568 is provided farther to the inside in the radial direction than the O-ring retaining portion 262c. The positioning portion 568 protrudes from the end portion on the front side (the −Z side) of the housing accommodation outer peripheral portion 62a to the front side. The positioning portion 568 preferably includes a base portion 568a including a positioning end surface (the first end surface) 568d and a tip protrusion portion 568b including a positioning side surface (the first side surface) 568c.

The base portion 568a is connected to an end portion on the front side (the −Z side) of the housing accommodation outer peripheral portion 62a. The positioning end surface 568d is the end surface on the front side of the base portion 568a. The positioning end surface 568d is a flat surface extending radially inward from the positioning side surface 568c. The positioning end surface 568d is in contact with a bobbin end surface (the end surface) 44c on the rear side (the +Z side) of the outer bobbin protrusion portion 44b of the bobbin 44.

The tip protrusion portion 568b protrudes from an end portion on the outside in the radial direction of the positioning end surface 568d of the base portion 568a to the front side (the −Z side). The positioning side surface 568c is the side surface on the inside in the radial direction of the tip protrusion portion 568b. The positioning side surface 568c is connected to the positioning end surface 568d and extends from the positioning end surface 568d to the front side (the −Z side). The positioning side surface 568c is located on the outside in the radial direction of the positioning end surface 568d. The positioning side surface 568c contacts a bobbin outer side surface (the outer side surface) 44d which is the side surface on the outside in the radial direction of the outer bobbin protrusion portion 44b, or faces the bobbin outer side surface 44d with the first gap interposed therebetween.

The positioning end surface 568d and the positioning side surface 568c preferably adopts the same configurations as the small-diameter portion step surface 63d and the large-diameter portion side surface 63e in the first preferred embodiment, with respect to configurations other than those described above.

According to this preferred embodiment, similar to the first preferred embodiment, the main body portion 561a is positioned by the bobbin 44 of the stator 40 in the axial direction (the Z-axis direction) and the radial direction of the shaft 31, and therefore, an increase in the size of the housing 20 is prevented.

In addition, in this preferred embodiment, the following configurations may be adopted.

In the above description, a configuration has been described in which the positioning side surface 568c on the inside in the radial direction of the tip protrusion portion 568b contacts the bobbin outer side surface 44d on the outside in the radial direction of the outer bobbin protrusion portion 44b or faces the bobbin outer side surface 44d with the first gap interposed therebetween. However, it is not limited thereto. In this preferred embodiment, a configuration is also acceptable in which the side surface on the outside in the radial direction of the tip protrusion portion 568b contacts the side surface on the inside in the radial direction of the outer bobbin protrusion portion 44b or faces the side surface on the inside in the radial direction of the outer bobbin protrusion portion 44b with the first gap interposed therebetween.

Further, in this preferred embodiment, a configuration is also acceptable in which the positioning end surface 568d of the positioning portion 568 contacts the end surface of the inner bobbin protrusion portion 44a and the positioning side surface 568c of the positioning portion 568 contacts the side surface of the inner bobbin protrusion portion 44a or faces the side surface of the inner bobbin protrusion portion 44a with the first gap interposed therebetween.

In addition, in all of the first to fourth preferred embodiments described above, a configuration has been described in which the first end surface and the first side surface of the main body portion are positioned together with respect to the same member, for example, the core back portion, the teeth portion, or the bobbin. However, it is not limited thereto. In the preferred embodiments of the present invention, the first end surface and the first side surface of the main body portion may be respectively positioned with respect to different members. For example, in the preferred embodiments of the present invention, a configuration is also acceptable in which the first end surface contacts the end surface on the rear side of the core back portion and the first side surface contacts the inner side surface of the teeth portion or faces the inner side surface of the teeth portion with the first gap interposed therebetween, and a configuration is also acceptable in which the first end surface contacts the end surface on the rear side of the bobbin and the first side surface contacts the side surface of the core back portion or faces the side surface of the core back portion with the first gap interposed therebetween.

Further, in all of the first to fourth preferred embodiments described above, a configuration has been described in which the first end surface of the main body portion of the bus bar holder preferably contacts the end surface on the rear side of the stator, such that the axial positioning of the main body portion is performed. However, it is not limited thereto. In the preferred embodiments of the present invention, for example, a configuration may be made in which a groove is provided in the side surface of the stator, a positioning portion protruding to the front side and including a hook-like tip is provided at the main body portion, and the hook-like tip of the positioning portion is inserted into the groove of the side surface of the stator, such that the axial positioning of the main body portion is performed.

Further, in all of the first to fourth preferred embodiments described above, a configuration has been described in which the first side surface of the main body portion of the bus bar holder contacts the side surface of the stator or faces the side surface of the stator with the first gap interposed therebetween, such that the radial positioning of the main body portion is performed. However, it is not limited thereto. In the preferred embodiments of the present invention, the main body portion and the stator may be disposed in any way as far as the main body portion is positioned by the stator in the axial direction and the radial direction of the shaft.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
   a rotor including a shaft centered on a central axis extending in one direction;
   a stator surrounding the rotor and configured to rotate the rotor around the shaft;
   a first bearing located on a first side in the one direction of the stator and configured to support the shaft;

a second bearing located on a second side opposite to the first side of the stator and configured to support the shaft;

a bus bar portion configured to supply an electric drive current to the stator; and a tubular housing configured to retain the bus bar portion, the stator, and the first bearing, wherein the housing includes a circular or substantially circular bottom portion including a through-hole and a first bearing retaining portion configured to retain the first bearing and extending in the one direction, the housing includes an output shaft hole which is open to the first side, the first bearing retaining portion includes at least a portion of the output shaft hole, an end portion on the first side of the shaft protrudes from the output shaft hole to the outside of the housing through the through-hole, the bus bar portion includes a bus bar which is electrically connected to the stator, and a bus bar holder which supports the bus bar, the bus bar holder includes a second bearing retaining portion configured to retain the second bearing, and a tubular main body portion, the main body portion is positioned by the stator in the one direction and a radial direction of the shaft, the main body portion includes:
- a first end surface which contacts an end surface on the second side of the stator and extends in the radial direction, and
- a first side surface which is located outside in the radial direction or inside in the radial direction of the first end surface, extends in the one direction, and contacts a side surface of the stator or faces the side surface of the stator with a first gap interposed therebetween, the main body portion includes an increased-diameter stepped portion which includes the first end surface and the first side surface, a diameter of the increased-diameter stepped portion increases toward the first side due to the first side surface being inclined, the housing includes a first housing portion, the stator is retained in the first housing portion, the first housing portion includes a first tubular portion which surrounds an end portion on the first side of the bus bar portion from outside in the radial direction of the shaft, the bus bar holder includes a connector portion which is connected to an external power supply, the main body portion includes a connector connection portion which is connected to the connector portion, the connector connection portion protrudes radially outward from inside of the first tubular portion, a fourth gap is provided between the end portion on the second side of the first tubular portion and the connector connection portion, the first tubular portion includes a flange portion which extends out from a curved portion of the first tubular portion, the flange portion being directly axially opposed to the connector connection portion and defining the end portion on the second side of the first tubular portion, and a first O-ring is provided between the first housing portion and the bus bar holder, the main body portion includes a first O-ring retaining portion on the first side, a reduced-diameter stepped portion in which a diameter is reduced is provided on a first side of an outer circumferential surface of the first O-ring retaining portion, at least a portion of the first O-ring is retained in the reduced-diameter stepped portion, the reduced-diameter stepped portion includes a second side surface which is a portion of an outer circumferential surface of the first O-ring retaining portion, and a second end surface intersecting the second side surface, and a convex portion is provided on the second side surface at a position separated from the second end surface of the reduced-diameter stepped portion.

2. The motor according to claim 1, wherein the stator includes a stator core which includes a core back portion and a teeth portion, and a coil portion disposed at the teeth portion, the first end surface contacts an end surface on the second side of the stator core, and the first side surface contacts a side surface of the stator core or faces the side surface of the stator core with the first gap interposed therebetween.

3. The motor according to claim 2, wherein the side surface of the stator core is an outer side surface or an inner side surface of the core back portion.

4. The motor according to claim 2, wherein the side surface of the stator core is an inner side surface of the teeth portion, and the first end surface extends radially outward from the first side surface.

5. The motor according to claim 2, wherein the stator core includes a concave portion which is recessed from the end surface on the second side to the first side, and the side surface of the stator core is an inner wall surface of the concave portion.

6. The motor according to claim 2, wherein a shape of the core back portion is a cylindrical or substantially shape which is concentric with the shaft, the teeth portion extends toward the shaft from an inner side surface of the core back portion, a plurality of the teeth portions are provided and the plurality of teeth portions are disposed at equal or substantially equal intervals in a circumferential direction of the inner side surface of the core back portion, a second gap is located between the teeth portion and the rotor, and a dimension in the radial direction of the first gap is smaller than a dimension in the radial direction of the second gap.

7. The motor according to claim 1, wherein the stator includes a stator core which includes a core back portion and a teeth portion, a coil portion disposed at the teeth portion, and an insulator which is interposed between at least the stator core and the coil portion, the insulator includes an insulator protrusion portion which is provided on the second side of the stator core and extends in the one direction, the first end surface contacts an end surface of the insulator protrusion portion, and the first side surface contacts a side surface of the insulator protrusion portion or faces the side surface of the insulator protrusion portion with the first gap interposed therebetween.

8. The motor according to claim 7, wherein
a shape of the core back portion is a cylindrical or substantially cylindrical shape which is concentric with the shaft,
the teeth portion extends toward the shaft from an inner side surface of the core back portion,
a plurality of the teeth portions are provided and the plurality of teeth portions are disposed at equal or substantially equal intervals in a circumferential direction of the inner side surface of the core back portion,
a second gap is located between the teeth portion and the rotor, and
a dimension in the radial direction of the first gap is smaller than a dimension in the radial direction of the second gap.

9. The motor according to claim 1, wherein
the first end surface and the first side surface are connected,
the first end surface is a flat surface, and
the first side surface is a surface positioned along the side surface of the stator.

10. The motor according to claim 1, wherein a dimension in the one direction of the first side surface is larger than a dimension in the radial direction of the first end surface.

11. The motor according to claim 1, wherein
the housing includes a second housing portion, and
the second housing portion includes a lid portion which covers an end portion on the second side of the main body portion, and a second tubular portion which surrounds the end portion on the second side of the main body portion from outside in the radial direction and is connected to an end portion on the second side of the first tubular portion.

12. The motor according to claim 11, wherein a third gap is provided between the main body portion and the lid portion.

13. The motor according to claim 11, wherein a contact portion which contacts the second housing portion is provided in the main body portion.

14. The motor according to claim 13, wherein the contact portion is provided in an outer edge in an end portion on the second side of the bus bar holder.

15. The motor according to claim 11, wherein a second O-ring is provided between the second housing portion and the bus bar holder.

16. The motor according to claim 15, wherein at least a portion of the second O-ring is disposed in an area in which the stator and the main body portion overlap each other in the one direction.

17. The motor according to claim 1, wherein
a plurality of convex portions are provided, and
the plurality of convex portions are disposed at equal or substantially equal intervals in a circumferential direction of the second side surface.

18. A motor comprising:
a rotor including a shaft centered on a central axis extending in one direction;
a stator surrounding the rotor and configured to rotate the rotor around the shaft;
a first bearing located on a first side in the one direction of the stator and configured to support the shaft;
a second bearing located on a second side opposite to the first side of the stator and configured to support the shaft;
a bus bar portion configured to supply an electric drive current to the stator; and
a tubular housing configured to retain the bus bar portion, the stator, and the first bearing, wherein
the housing includes a circular or substantially circular bottom portion including a through-hole and a first bearing retaining portion configured to retain the first bearing and extending in the one direction,
the housing includes an output shaft hole which is open to the first side,
the first bearing retaining portion includes at least a portion of the output shaft hole,
an end portion on the first side of the shaft protrudes from the output shaft hole to the outside of the housing through the through-hole,
the bus bar portion includes a bus bar which is electrically connected to the stator, and a bus bar holder which supports the bus bar,
the bus bar holder includes a second bearing retaining portion configured to retain the second bearing, and a tubular main body portion,
the main body portion is positioned by the stator in the one direction and a radial direction of the shaft,
the main body portion includes:
a first end surface which contacts an end surface on the second side of the stator and extends in the radial direction, and
a first side surface which is located outside in the radial direction of the first end surface, extends in the one direction, and contacts a side surface of the stator or faces the side surface of the stator with a first gap interposed therebetween,
the main body portion includes an increased-diameter stepped portion which includes the first end surface and the first side surface,
a diameter of the increased-diameter stepped portion increases toward the first side due to the first side surface being inclined with an inclination angle greater than 0° and less than 90°, the inclined portion of the first side surface being defined on a radially outermost surface of the main body portion which directly contacts a radially inner surface of the housing, and
a first O-ring is provided between the first housing portion and the bus bar holder,
the main body portion includes a first O-ring retaining portion on the first side,
a reduced-diameter stepped portion in which a diameter is reduced is provided on a first side of an outer circumferential surface of the first O-ring retaining portion,
at least a portion of the first O-ring is retained in the reduced-diameter stepped portion, the reduced-diameter stepped portion includes a second side surface which is a portion of an outer circumferential surface of the first O-ring retaining portion, and a second end surface intersecting the second side surface, and
a convex portion is provided on the second side surface at a position separated from the second end surface of the reduced-diameter stepped portion.

19. The motor according to claim 18, wherein
the stator includes a stator core which includes a core back portion and a teeth portion, and a coil portion disposed at the teeth portion,
the first end surface contacts an end surface on the second side of the stator core, and
the first side surface contacts a side surface of the stator core or faces the side surface of the stator core with the first gap interposed therebetween.

20. The motor according to claim 18, wherein the side surface of the stator core is an outer side surface or an inner side surface of the core back portion.

21. The motor according to claim 18, wherein
a shape of the core back portion is a cylindrical or substantially shape which is concentric with the shaft,
the teeth portion extends toward the shaft from an inner side surface of the core back portion,
a plurality of the teeth portions are provided and the plurality of teeth portions are disposed at equal or substantially equal intervals in a circumferential direction of the inner side surface of the core back portion,
a second gap is located between the teeth portion and the rotor, and
a dimension in the radial direction of the first gap is smaller than a dimension in the radial direction of the second gap.

22. The motor according to claim 18, wherein
the first end surface and the first side surface are connected,
the first end surface is a flat surface, and
the first side surface is a surface positioned along the side surface of the stator.

23. The motor according to claim 18, wherein a dimension in the one direction of the first side surface is larger than a dimension in the radial direction of the first end surface.

24. The motor according to claim 18, wherein
the housing includes a first housing portion and a second housing portion,
the stator is retained in the first housing portion,
the first housing portion includes a first tubular portion which surrounds an end portion
on the first side of the bus bar portion from outside in the radial direction of the shaft, and
the second housing portion includes a lid portion which covers an end portion on the second side of the main body portion, and a second tubular portion which surrounds the end portion on the second side of the main body portion from outside in the radial direction and is connected to an end portion on the second side of the first tubular portion.

25. The motor according to claim 24, wherein a third gap is provided between the main body portion and the lid portion.

26. The motor according to claim 25, wherein
the bus bar holder includes a connector portion which is connected to an external power supply,
the main body portion includes a connector connection portion which is connected to the connector portion,
the connector connection portion protrudes radially outward from inside of the first tubular portion, and
a fourth gap is provided between the end portion on the second side of the first tubular portion and the connector connection portion.

27. The motor according to claim 24, wherein a contact portion which contacts the second housing portion is provided in the main body portion.

28. The motor according to claim 27, wherein the contact portion is provided in an outer edge in an end portion on the second side of the bus bar holder.

29. The motor according to claim 24, wherein
the bus bar holder includes a connector portion which is connected to an external power supply,
the main body portion includes a connector connection portion which is connected to the connector portion,
the connector connection portion protrudes radially outward from inside of the first tubular portion, and
a fourth gap is provided between the end portion on the second side of the first tubular portion and the connector connection portion.

30. The motor according to claim 24, wherein
the first tubular portion includes a flange portion which extends out from a curved portion of the first tubular portion, the flange portion being directly axially opposed to the connector connection portion and defining the end portion on the second side of the first tubular portion.

31. The motor according to claim 18, further comprising a second O-ring between the second housing portion and the bus bar holder.

32. The motor according to claim 31, wherein at least a portion of the second O-ring is disposed in an area in which the stator and the main body portion overlap each other in the one direction.

33. The motor according to claim 18, wherein
a plurality of convex portions are provided, and
the plurality of convex portions are disposed at equal or substantially equal intervals in a circumferential direction of the second side surface.

* * * * *